United States Patent
Thierman

(10) Patent No.: US 9,109,877 B2
(45) Date of Patent: *Aug. 18, 2015

(54) METHOD AND APPARATUS FOR DIMENSIONAL MEASUREMENT

(76) Inventor: Jonathan S. Thierman, Baltimore, MD (US)

( * ) Notice: Subject to any disclaimer, the term of this patent is extended or adjusted under 35 U.S.C. 154(b) by 251 days.

This patent is subject to a terminal disclaimer.

(21) Appl. No.: 12/907,531

(22) Filed: Oct. 19, 2010

(65) Prior Publication Data

US 2011/0288816 A1 Nov. 24, 2011

Related U.S. Application Data

(63) Continuation-in-part of application No. 12/784,694, filed on May 21, 2010, now Pat. No. 8,401,816, and a continuation-in-part of application No. 12/859,726, filed on Aug. 19, 2010, now Pat. No. 8,615,376.

(51) Int. Cl.
*G01C 9/00* (2006.01)
*G01C 17/00* (2006.01)
*G01C 7/00* (2006.01)
*G01B 11/00* (2006.01)
*G01C 15/00* (2006.01)

(52) U.S. Cl.
CPC ............ *G01B 11/002* (2013.01); *G01C 15/002* (2013.01)

(58) Field of Classification Search
CPC ....... G01C 1/02; G01C 15/002; G01B 11/002
USPC ............................................. 702/151; 33/284
See application file for complete search history.

(56) References Cited

U.S. PATENT DOCUMENTS

| 4,615,617 A | 10/1986 | Frank et al. |
| 4,620,788 A | 11/1986 | Giger |
| 5,815,251 A | 9/1998 | Ehbets et al. |

(Continued)

FOREIGN PATENT DOCUMENTS

| WO | WO94/27164 | 11/1994 |
| WO | WO98/18019 | 4/1998 |

(Continued)

*Primary Examiner* — Toan Le
*Assistant Examiner* — Manuel Rivera Vargas
(74) *Attorney, Agent, or Firm* — Intrinsic Law Corp.; Ibrahim M. Hallaj

(57) ABSTRACT

A non-contacting, out-of-plane measurement apparatus for measuring distances, angles and related geometric quantities, and for computing other quantities based on the measurements, is provided. The measurement apparatus can measure distances to target points of interest and can also measure angles therebetween, including angles with respect to at least one or two degrees of freedom so as to compute information determining vector segments between a reference point and the points of interest, then, to compute lengths and areas and volumes of objects of interest defined by the points of interest. In some cases, areas of polygons can be measured as sums of cross-products of the computed vectors to the points of interest located at the vertices of the polygons. Also, computing constituent triangular projections onto a polygon of interest using said apparatus then summing said constituent triangular projections so as to arrive at an area of said polygon. The apparatus and its methods are extendable to non-planar and three-dimensional calculations as well. In this way, the apparatus, or its user, are not required to be located at any special place or in-plane with the object (e.g., plane of a polygon) being measured.

19 Claims, 17 Drawing Sheets

(56) References Cited

U.S. PATENT DOCUMENTS

| | | | |
|---|---|---|---|
| 5,949,531 A | 9/1999 | Ehbets et al. | |
| 6,463,393 B1 | 10/2002 | Giger | |
| 6,727,985 B2 | 4/2004 | Giger | |
| 6,859,744 B2 | 2/2005 | Giger | |
| 6,864,966 B2 | 3/2005 | Giger | |
| 7,030,969 B2 | 4/2006 | Giger | |
| 7,042,452 B1 * | 5/2006 | Wasserman et al. | 345/423 |
| D607,353 S | 1/2010 | Hackenberg | |
| 2006/0137194 A1 * | 6/2006 | Tyroler | 33/277 |
| 2006/0201006 A1 * | 9/2006 | Burlingham et al. | 33/284 |
| 2009/0086199 A1 * | 4/2009 | Troy et al. | 356/251 |
| 2009/0142002 A1 * | 6/2009 | Middendorf | 382/286 |
| 2009/0225161 A1 * | 9/2009 | Otani et al. | 348/135 |

FOREIGN PATENT DOCUMENTS

| | | |
|---|---|---|
| WO | WO02/16964 | 2/2002 |
| WO | WO02/44754 | 6/2002 |

* cited by examiner

US 9,109,877 B2

METHOD AND APPARATUS FOR DIMENSIONAL MEASUREMENT

RELATED APPLICATIONS

This application is a continuation in part (CIP) of and claims the benefit of related U.S. patent application Ser. Nos. 12/784,694, entitled "Apparatus and Method for Geometric Measurement," filed on May 21, 2010, and 12/859,726, entitled "Method and Apparatus for Dimensional Measurement," filed on Aug. 19, 2010, each of which is hereby incorporated by reference.

TECHNICAL FIELD

The present application relates to measuring distances, areas, angles and volumes in space, including those with irregular shaped dimensions, using an energy source and sensor such as a laser light source and sensor or ultrasonic source and sensor, and in particular, to measuring such dimensions from a location that is out of the plane of an object being measured.

BACKGROUND

Distances can be measured using standard measuring contraptions such as yardsticks, rulers, and so on. These devices generally measure linear distances representing a distance between a first point and a second point in Euclidean space (e.g., in a plane) along a straight line. The linear distances are considered to be the shortest distances between two points, and have generally been used since antiquity.

Other techniques have been in existence for some time include flexible tape measures and wheel-based rolling measures that allow the distance along a non-linear (e.g., curved) path to be measured. These things are useful for measuring a circumference of a curved surface or the distance along a winding perimeter, path, and so on.

Generally speaking, all of the above measuring devices require the user carrying out the measurement to physically position the devices, or ends thereof at two or more locations along the object being measured. For example, to measure the length of an object with a ruler, a person holds the ruler against the object and reads off the measurement increments to obtain the length reading. And to use a flexible tape measure, the user holds the tape against the surface being measured and reads off the units of measurement.

These devices above are not conducive to measuring the length of an object in an inaccessible location. For example, if a person standing on the ground wishes to measure the length of a beam along an elevated ceiling of a building, the person would typically climb up to the ceiling on a ladder to place a ruler or tape measure against the beam to measure its length. This can be inconvenient, dangerous, or not possible.

Some distance measurement devices have been developed recently that do not require physical contact or proximal placement against the objects being measured. For example, commercially available "laser distance measuring" devices or "laser range finder" products can be used from a position remote to the object being measured. These products deliver a beam of laser light, which is projected out from a hand-held apparatus, impinging upon the object whose distance is to be measured, and displaying to the user a distance from the apparatus to the object upon which the laser light is being shone.

In some cases, existing systems require measurements to be conducted from a reference point situated in-line with a side of an object of interest or in the plane of the object of interest, and so they are not convenient. Also, being able to deliver a beam from a measurement apparatus to a point of interest lying in a plane of a solid object is not practical and grazes the object at an extremely shallow angle (theoretically a zero degree angle of incidence on the face of the object) so that receiving a meaningfully measurable return scattered signal is difficult or impossible or forces the user to actually depart from the actual plane of the object—thereby reducing the accuracy of the measurement being made.

It has not been possible or practical so far to make measurements that a user can conduct at a distance from the object being measured conveniently and accurately, especially if the measurements are along irregular or non-linear paths, it also has been impossible or impractical to measure such lengths, areas, and volumes of objects from a location that is not proximal to or in-plane with the object being measured.

SUMMARY

In some embodiments, the present disclosure provides an apparatus for making measurements and computations of geometric quantities such as distances, areas and volumes. The measurements may be performed by pointing a measurement apparatus towards a plurality of points of interest in space, for example, points on an object of interest. More specifically, the measurements may be made by pointing a visible coherent light beam towards points on an object of interest or along a path so that the measurement apparatus can measure the plurality of distances to the respective points of interest and use geometric and/or trigonometric relations to compute said geometric quantities.

Some embodiments are directed to a non-contacting, out-of-plane measurement apparatus for measuring distances, angles and related geometric quantities, and for computing other quantities based on the measurements, is provided. The measurement apparatus can measure distances to target points of interest and can also measure angles therebetween, including angles with respect to at least one or two degrees of freedom so as to compute information determining vector segments between a reference point and the points of interest, then, to compute lengths and areas and volumes of objects of interest defined by the points of interest. In some cases, areas of polygons can be measured as sums of cross-products of the computed vectors to the points of interest located at the vertices of the polygons. In this way, the apparatus, or its user, are not required to be located at any special place or in-plane with the object (e.g., plane of a polygon) being measured.

Methods for determining the geometric quantities, for example, lengths, areas, volumes are also provided for use in the apparatus. For example, as would be implemented in hardware and software instructions executing in processing circuits of said hardware. The methods and systems below take advantage of distance and angle sensing measurement devices in the apparatus to provide inputs to a processing circuit that then computes the geometric quantities and outputs to a user interface or another circuit or storage medium the results of the computations.

In some aspects, the device provides a visible (or apparent) illuminated path along which it is computing the measured geometric quantity. For example, along a straight line connecting two spatial points of interest, or the vertexes of a triangle, rectangle, or polygon of interest.

In other aspects, the present disclosure provides a method and apparatus that allow measurement of lengths, areas, angles, volumes, path lengths, and so on for objects that the user is not proximal to or in-line or in-plane with. For example, to measure an area of a surface where the user is not standing in-plane with said surface or in any particular special location with respect to the surface being measured.

In some aspects, the device includes a user interface so that a user can actuate a button to indicate that the device is shining the coherent light beam at a point of interest and to capture a distance related to this point of interest.

One embodiment includes an encoder or sensor to capture angular rotation of the apparatus may be used to complete the information needed to determine the geometric quantities of interest in at least two degrees of freedom in a three-dimensional reference coordinate system, e.g. a Cartesian or spherical coordinate system.

Another embodiment is directed to an apparatus for measuring and computing geometric dimensions, including an area of a polygon in three-space, comprising a housing suitable for a human user to grip and carry the apparatus thereby; a coherent light source that can be directed along a direction so as to illuminate a target point of interest in space; a distance measurement element including a circuit that determines a distance from the apparatus to said target point of interest; an angular displacement or rotational sensing element that determines an angular position of said target point of interest; a data storage element that stores data representative of said measured distance and said angular position; a processor that receives inputs representative of at least said distance and said angular position for said target point of interest, representative of a vector connecting said reference point and said target point of interest, said processor further comprising circuitry and instructions adapted to compute a sum of cross-products of said vector with other vectors connecting said reference point and respective other target points of interest; and a user interface adapted to receive inputs from said human user to control said operational features of said apparatus and adapted to display a result of said sum of said cross-products representative of an area of a polygon defined by said target points of interest

BRIEF DESCRIPTION OF THE DRAWINGS

For a fuller understanding of the nature and advantages of the present concepts, reference is be made to the following detailed description of preferred embodiments and in connection with the accompanying drawings, in which.

DETAILED DESCRIPTION

As discussed above, it is useful to be able to measure geometric distances, areas and volumes, especially if they are inconvenient to reach by a user, and especially if one or more of their dimensions is not linear or regular in shape. A measuring apparatus that does not require laying the apparatus out against the object being measured, or a non-contacting apparatus is useful in numerous ways as will be described below.

Figure 1:
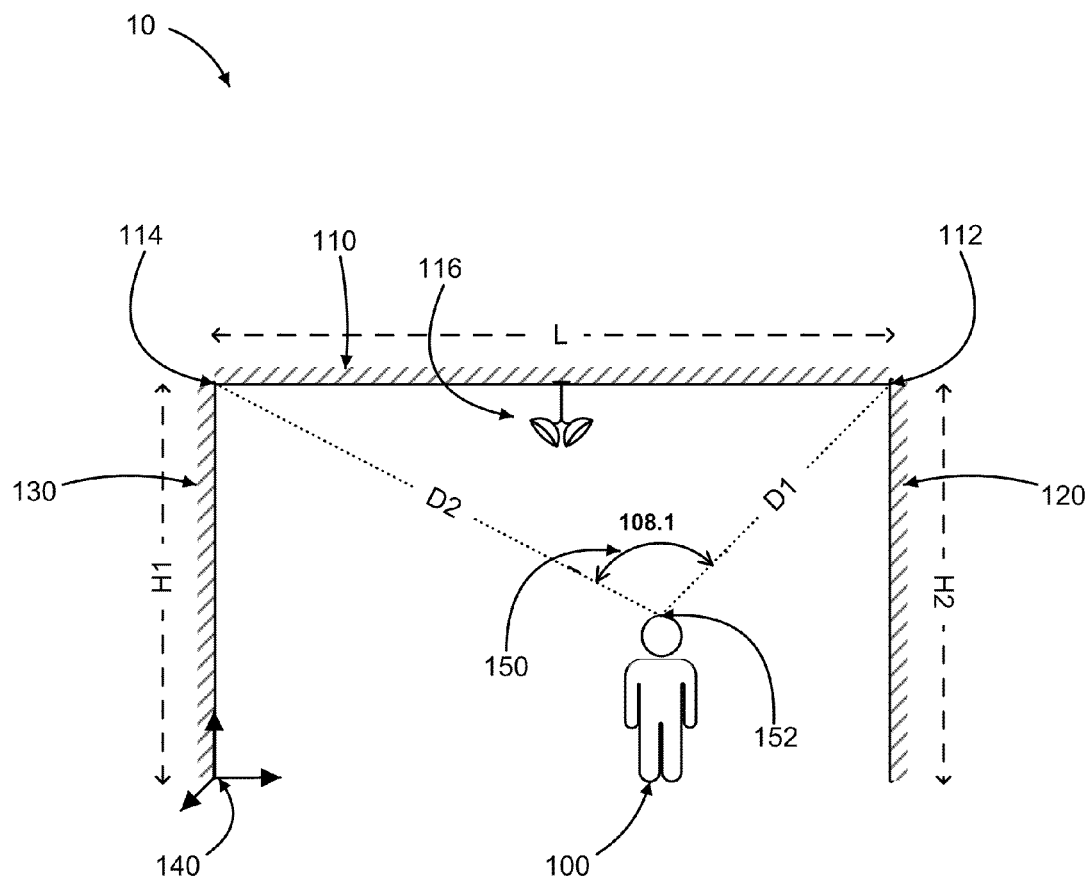
FIG. 1 illustrates a first problem for measuring the length of an elevated beam or dimension which the user cannot easily reach.

To illustrate a first problem or scenario for use of the present method and system, FIG. 1 shows a space 10 such as an interior building space (e.g., a room), whose dimensions can be defined with respect to a coordinate system or frame of reference 140. A user 100 stands within the space and wishes to determine the length L of the ceiling 110 or the room. The ceiling is elevated above user 100 and it is not safe or convenient or possible for user 100 to manually or physically reach the ceiling 110. The ceiling 110 runs between two upright walls 130 and 120 having heights H1 and H2 respectively. The length to be determined (L) runs in a substantially straight line between ceiling end points 112 and 114. Conventionally, user 100 would get up on a ladder to reach the ceiling 110 with a mechanical measuring device such as a tape measure, which is run from first point 112 to a second point 114. This is not always possible or convenient or safe, and can require a second person to assist. In addition, mechanical measuring devices can be too short or shaped in a way that is not conducive for such measurement. Furthermore, if an obstacle, e.g. another beam or light fixture 116 protrudes from the length to be measured this can complicate or prevent easy and accurate measurement of length L.

It is understood that by sufficient determination of a pair of distances D1 and D2, which have a common origin 152 (e.g., near user 100) and terminate at points 112 and 114 respectively, and the angle 150 therebetween, the length L can be calculated from basic geometric relationships of the triangle defined by trio of points (112, 114, 152).

Some products have been devised to measure a length between two points, e.g., between 152 to 112 (distance D1) using traveling pulses or beams of light, laser, sound, etc. These devices are presently incapable of truly flexible measurements in one or more dimensions as will be described below. Some present devices can measure a desired object's length along a straight line, but only if the intermediate distances defining the ends of the desired object's length define an exact right angle triangle with respect to the object or lie within a plane with the object being measured. Therefore, as will be further discussed below, the present method and apparatus is useful in allowing more free and flexible determination of dimensions, distances, and geometric information about the objects being measured.

Figure 2:
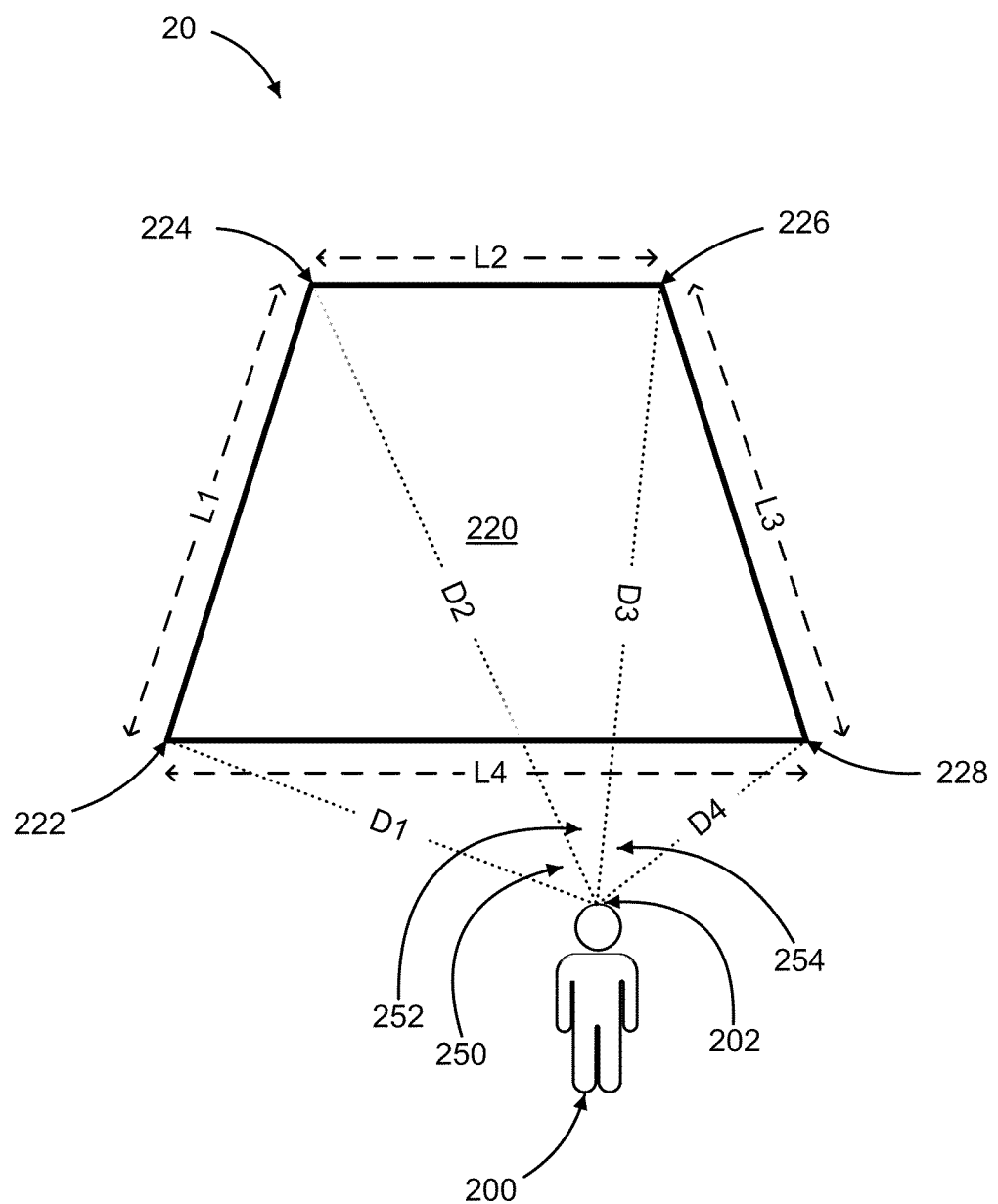
FIG. 2 illustrates measurement an area bounded by a plurality of line segments.

FIG. 2 illustrates an exemplary scenario 20 for measuring an area of a multi-sided planar object or space 220 from within the plane of the object. The object in this example is in the shape of a trapezoid, but may be of an arbitrary nature for the present purposes. For example the shape may be a square, rectangle, triangle, pentagon, octagon, or other regular or irregular multi-sided object.

A user 200 having a point of reference 202 wishes to establish the area of the object 220. The user employs the measuring apparatus of the present invention to measure the distances D1, D2, D3 and D4 from his or her reference point 202 to each of the vertices 222, 224, 226 and 228 respectively. In addition, the present measuring apparatus and technique captures the planar angles 250, 252 and 254. Angle 250 is between vertices 222 and 224, angle 252 is between vertices 224 and 226 and angle 254 is between vertices 226 and 228.

A processor or computer in or coupled to the measuring apparatus will then use the measured distances D1, D2, D3 and D4 and the angles 250, 252 and 254 to compute the area of shape 220. In one embodiment, geometric relations of the triangles defined by the measured distances and angles are used to compute the area of shape 220. Specifically, in an exemplary embodiment, the area of object 220, "A220," is determined to be the sum of the areas of the triangles defined by the following triads of vertices:

$$A220=A(202,222,224)+A(202,224,226)+A(202,226,228)-A(202,222,228).$$

The measuring apparatus may be placed in the same plane as the planar object to be measured 220, in which the angles are measured in that same plane only. The coordinates of points 222, 224, 226, 228 are calculated and used with the formula for polygon area to calculate the area enclosed by the shape 220. Examples of a methods for computing such geometric quantities may be found in the art. See for example Beyer, W. H. (Ed.). *CRC Standard Mathematical Tables, 28th ed.* Boca Raton, Fla.: CRC Press, pp. 123-124, 1987, and Weisstein, Eric C. "Polygon Area," MathWorld, A Wolfram Resource (http://mathworld.wolfram.com/PolygonArea.html), which are incorporated herein by reference. Such methods and formulae may be encoded into machine readable instructions and loaded into memory devices for execution on a processor in the measuring apparatus.

Alternatively, as will be described below for volumetric measurements, the angles are measured in more than one plane or dimension. This would be the case if a user holds the device for measurement of the area of a wall facing the user and the user is not in the plane of the wall being measured. Or similarly, if a user is holding the device and standing on/above a floor of a room, the area of which is to be measured, and therefore the user and the measuring apparatus are not in the plane of the floor being measured. In either case, two (or three) dimensional geometric principles allow the proper measurement of the desired area.

Figure 3:
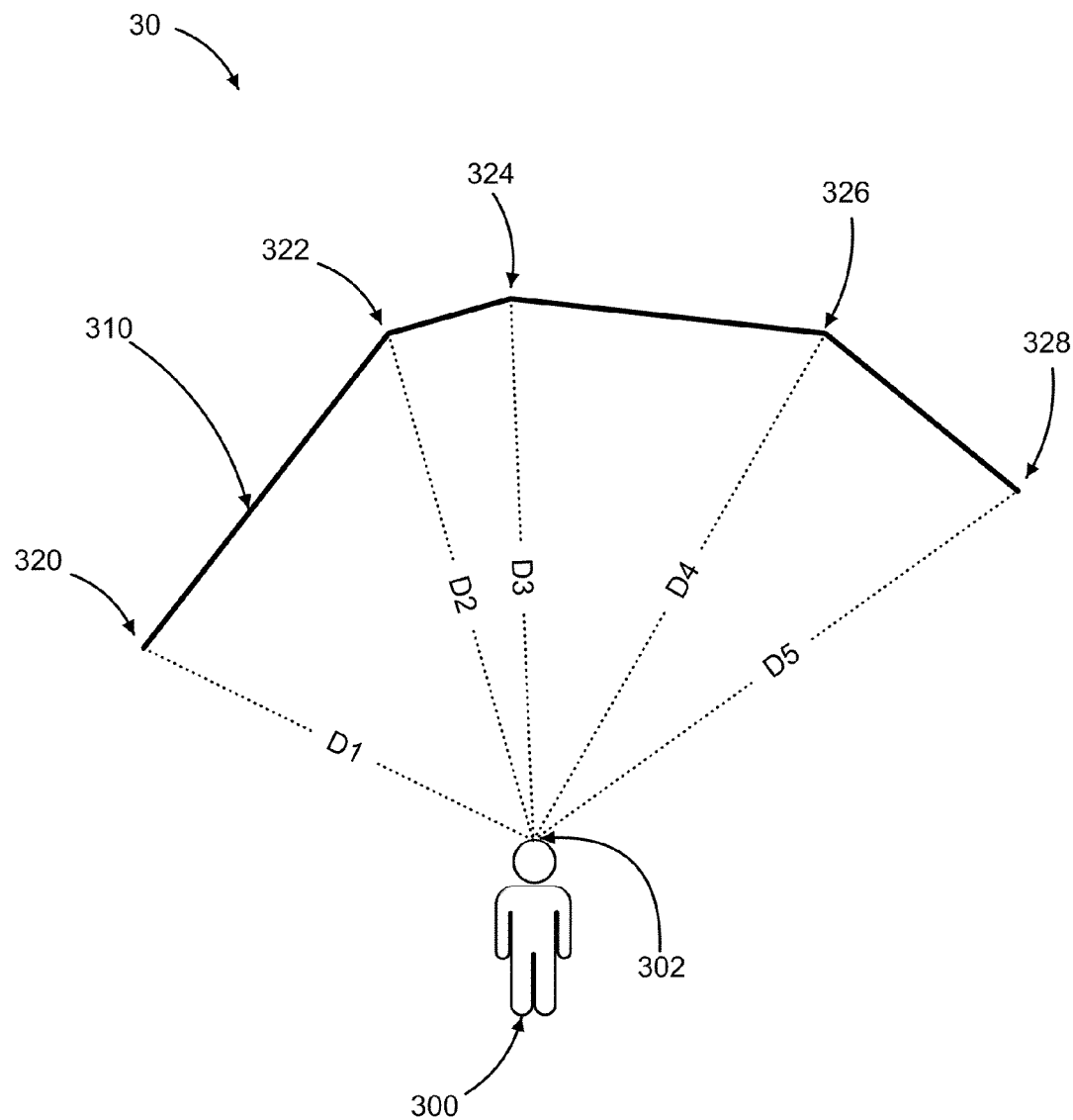
FIG. 3 illustrates measurement of a path comprising a plurality of line segments.

FIG. 3 illustrates a scenario 30 for measuring a sum of linear line segments 310, where the path along these segments from a starting point 320 to an ending point 328 is not determined by the shortest Euclidean distance (straight line) between points 320 and 328. Instead, the length of the desired path is determined by the sum of the line segments connecting the pairs: (320,322)+(322,324)+(324,326)+(326,328). These line segment lengths 310 can be individually determined as described above by measuring the distances D1, D2, D3, D4 and D5 to the respective inflection points 320, 322, 324, 326 and 328.

Therefore, the segmented path connecting points 320, 322, 324, 326, 328 can be measured by the present measuring apparatus by pointing the laser beam shone from the apparatus at each of the above points, then actuating or pressing an actuator to record the respective distance D1, D2, D3, D4, D5 and angles there between to the device's memory. The geometric relations and angles measured are used to compute the lengths of the discrete line segments, and the sum of the lengths of the line segments would be the total linear distance from point 320 to point 328 along the contour of the shape. As a specific illustrative example, the line segments may delineate a path along which an electrical extension or power cable is to be laid, or a shape of a room in a house, or the contour of a wall in a landscaping environment.

Figure 4:
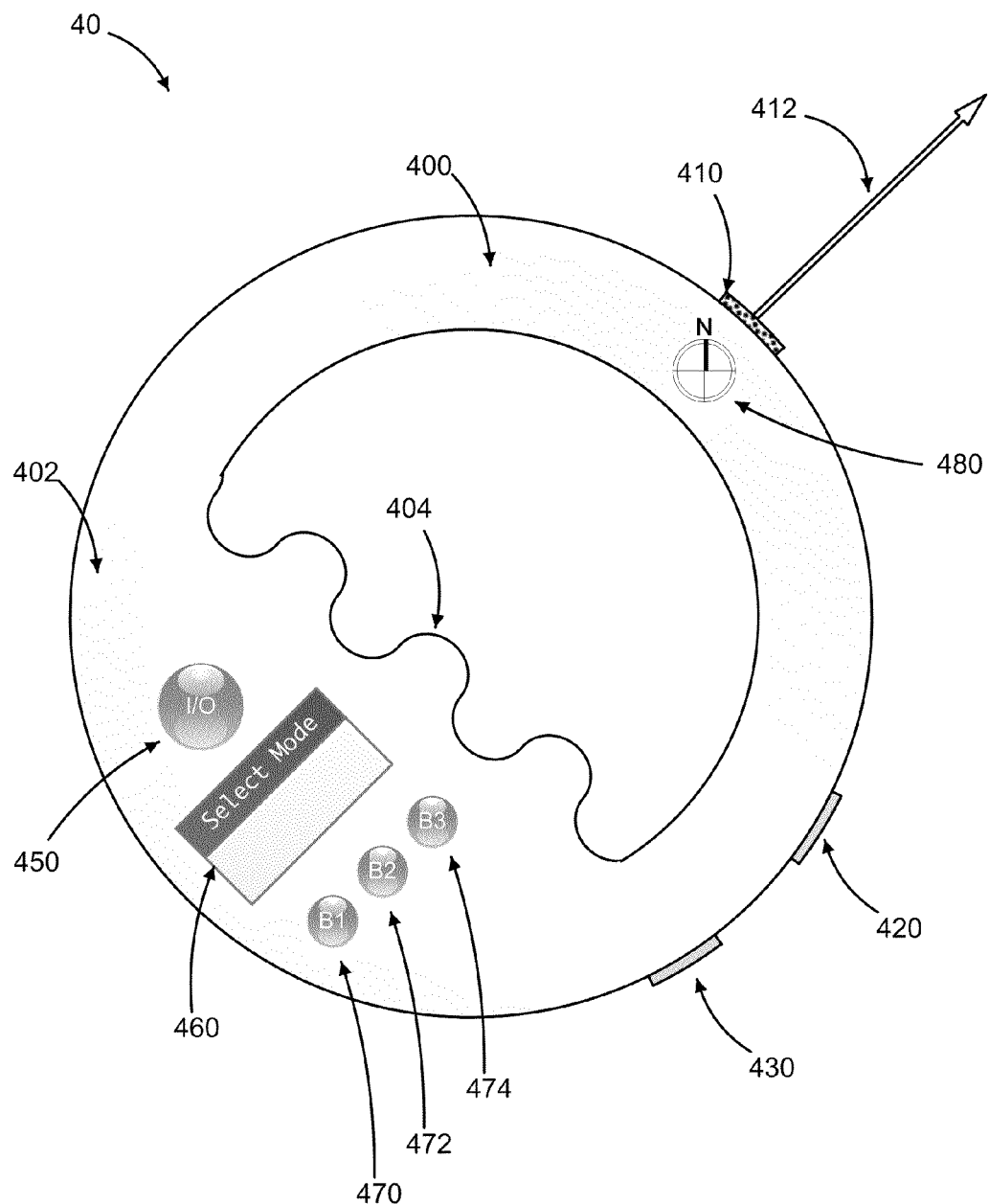
FIG. 4 illustrates an exemplary construction and user interface elements of a measurement apparatus.

FIG. 4 illustrates an exemplary embodiment of a measuring device according to the present disclosure. In this example, the measuring apparatus 40 has a generally circular body having a first portion 400 that houses a laser source assembly 410 from which a visible laser beam 412 is emitted. The apparatus also has a portion 402 which the user can hold in his or her hand. The portion 402 may be provided with an ergonomic grip portion 404 to allow secure holding of the apparatus. This makes it easy for the user to direct and point the device at a desired point.

The apparatus 40 may also be provided with a plurality of user interface and control components. For example, an ON/OFF switch or button 450 is used to turn the apparatus on and/or off. In some embodiments the apparatus is both hand-held and battery-powered, so it is useful to have a manual power switch. Also, the apparatus may automatically power down after a set period of non-use to conserve battery power. Other buttons 470, 472 and 474 provide features B1, B2 and B3 respectively as is discussed elsewhere in this disclosure relating to the use and operation of the apparatus.

Also, a digital display screen 460 may be provided for showing basic status and measurement information. The display and the other user interface elements may be used to select a MODE of operation of the apparatus. For example, to select a linear measurement mode (A-to-B), or area mode, volume mode, etc. The measured distances or angles may be shown on the digital display 460 and recorded in a memory device in the apparatus.

In some embodiments, the apparatus 40 contains one or more rechargeable DC power cells or batteries. These may be charged from a charging plug or terminal 420. The batteries may be rechargeable by connecting a power cord supplied with the apparatus to an AC power source, or the batteries may be recharged by connecting the apparatus to a universal serial bus (USB) or other standard connection that can provide power to charge the rechargeable batteries.

A data connector 430 is provided for uploading or downloading data to the apparatus. In some embodiments, the apparatus can download measurements taken in the field onto a computer so that the data can be stored on the computer or sent from the computer to other destinations as needed. The data downloaded to the computer may be used to compute further parameters from the measurements, to perform pricing tasks, or to assist designers or architects in their jobs.

Various embodiments for operating the measuring apparatus 40 are possible. In some embodiments, a button or switch such as those shown in FIG. 3 may be used to capture a distance measurement. The button or switch may be momentarily pressed to affect the measurement to the point at which laser beam 412 is pointed, or it may be depressed and held to show the distance to the indicated point in display screen 460.

As mentioned earlier, it is useful to be able to rotate the measuring apparatus, or to swivel it, so that its laser beam 412 swings between one point of interest and another, for example in indicating a first and second point on a line segment. To do this while keeping the apparatus 40 relatively stationary in space so that the laser source 410 does not translate, a pivot point 480 may be provided. Pivot point 480 can have several mechanical embodiments, each of which permit rotation with minimal or no translation of the laser source.

In a first embodiment, the apparatus 40 is mounted to a tripod or monopod that allows rotation of the apparatus 40 about one or more axes of pivot point 480. In a second embodiment, the apparatus 40 is provided with or includes a universal ball joint or bearing on which it can pivot, and the pivot point can rest on a support structure that can be set upon or rest on or fixed to a surface such as a counter top, the hood of a truck, a landscaping wall, a window sill, framing member, or the like. As would be appreciated, mechanical fixing methods such as suction cups, magnetic base elements, hook-and-loop tape, straps, elastic bands and other elements can be used to securely mount the apparatus to a convenient stationary member during measurement. A mini-tripod (tripod with short folding legs) and a ball joint is one example of a support and pivot structure that can be used herewith.

Figure 5:
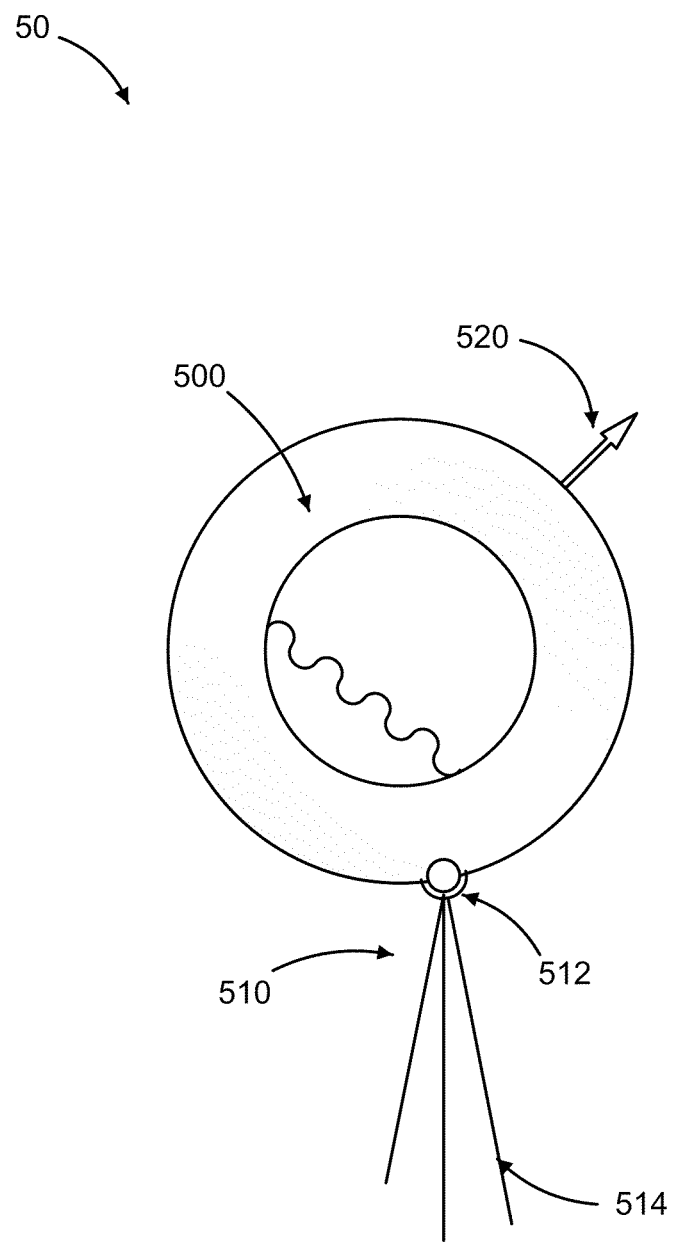
FIG. 5 illustrates an exemplary pivot support for rotating the measurement apparatus about one or more axes.

FIG. 5 illustrates one example of a miniature tripod support 510 that can be fixed to measuring apparatus 50 at a suitable point on the body 500 of the apparatus. A swiveling ball joint 512 allows pointing the laser beam 520 at a plurality of possible (sometimes infinitely adjustable) target spots. Three legs 514 support the apparatus, which can be placed onto a rigid or stable surface.

In some embodiments, a sensor or encoder such as an angular-position sensor is used to encode the absolute or relative angular position of the apparatus. This encoded position is then used to determine the angles between certain points of interest in one or more dimensions such as elevation and azimuthal positions.

Some or all of the present measuring apparatus embodiments may include a digital storage device or be adapted to coupling to a memory device so that the measurements and/or results of computed information can be stored onto the memory device for transfer to another machine or computer.

Additionally, some embodiments hereof allow the measuring device to send and/or receive information over a network, e.g., a wireless network such as a WiFi (IEEE 802.11) network, Bluetooth® (802.15) network, Ethernet, cellular, or other network.

The network exchange permits a user of the measuring device to receive information and to send measurements and calculation results to other persons or machines. In a specific embodiment, the measuring apparatus would store measured results for downloading to a computer where designers or architects or contractors can compute material needs or pricing. In addition, where equipped with pricing information, or where pricing information can be made available to the measuring device through communication with other things, the measuring apparatus itself can display in real-time the material needs or pricing associate therewith.

Take for example the case where the area 220 of FIG. 2 represents a room in a building under construction or renovation. A carpenter can determine the baseboard lengths needed by measuring the lengths L1 through L4 of the sides of the perimeter of the room 220. The carpenter can store this information for recall upon reaching the lumber supplier. Or, the carpenter can relay the measurements to his or her office for another staff member to order the materials. Alternatively, the carpenter can calculate, using pricing information, the cost of the baseboard materials and quote those to the home owner on the spot.

In another example, a wall-to-wall carpet installer may use the present system and method for determining a surface area 220 so that an amount of carpet or other flooring material can be ordered and pricing for the same calculated. Similarly, a painter may determine the area of one or more walls (if more than one wall is to be painted the areas of the individual walls may be stored and added together by the apparatus) and a price quote for the required paint and labor may be determined accordingly.

It should be apparent that three-dimensional variations of the present embodiments can also be made for volumetric calculations and measurements. For example, an air conditioning technician may need to determine the volume of a room or a space to ascertain the size and rating of the required air conditioning unit for the space. The technician would then employ the present measurement apparatus for measuring the distances to various vertex and corner points of the space, and measuring the angles there between. In this example, angles in more than one dimension are measured (e.g., azimuthal and elevation angles in three dimensions).

The present apparatus may make angular measurements in a number of ways. In one example, the angles are made by gyroscopic inputs to an angular position sensor. In other embodiments, a magnetic or compass-based angular position sensor may be employed. In yet other embodiments an optical or image-based sensor may be used to determine the angular position or displacement of the apparatus. Accelerometers and micro electro-mechanical sensors (MEMS) can be used to determine the rotation angle by which the measuring apparatus rotates between measurements of the points of interest. A suitable mechanical pivot, axis system, or other rotational bearing or joint can be used to rotate the measuring apparatus between measurements. For example, by moving the apparatus about a universal ball joint the user may point the measuring apparatus at a first point, take a first distance measurement to the first point, then rotate the apparatus to point at a second point, then take a second measurement to the second point, and so on. At each point of interest the user may tighten or lock down the apparatus to prevent unwanted movement thereof during the distance measurement. The apparatus may be equipped with a digital display that provides a readout to its user of the angle between the present position and an earlier position.

Like the earlier examples, the three-dimensional measurements may be made using a laser-based time of flight or interferometer measurement apparatus adapted as discussed herein to make and store the distances and/or angles to make the needed distance computations. A graphical display may provide a readout to the user of the apparatus indicating the distance to the point of interest at which the apparatus is pointing at any given time. The readout may update only upon actuating an actuator (e.g., pressing a button) or it may be continually updated or updated several times per second when the apparatus is powered on.

As alluded to above, the measurement apparatus may be equipped with a user interface (e.g., screen display, input/output (I/O) buttons or switches so that a user may press such a button or switch or other actuator to indicate that a measurement point is to be collected. In some embodiments, a visible laser beam is emitted so that the user can see the point to which the device will measure the distance. Once the laser beam, which shines a visible spot onto the point of interest, is in place, the user may actuate an actuator (e.g., press a button) and the apparatus will measure the distance from the apparatus to the spot onto which the laser light is shining.

Figure 6:
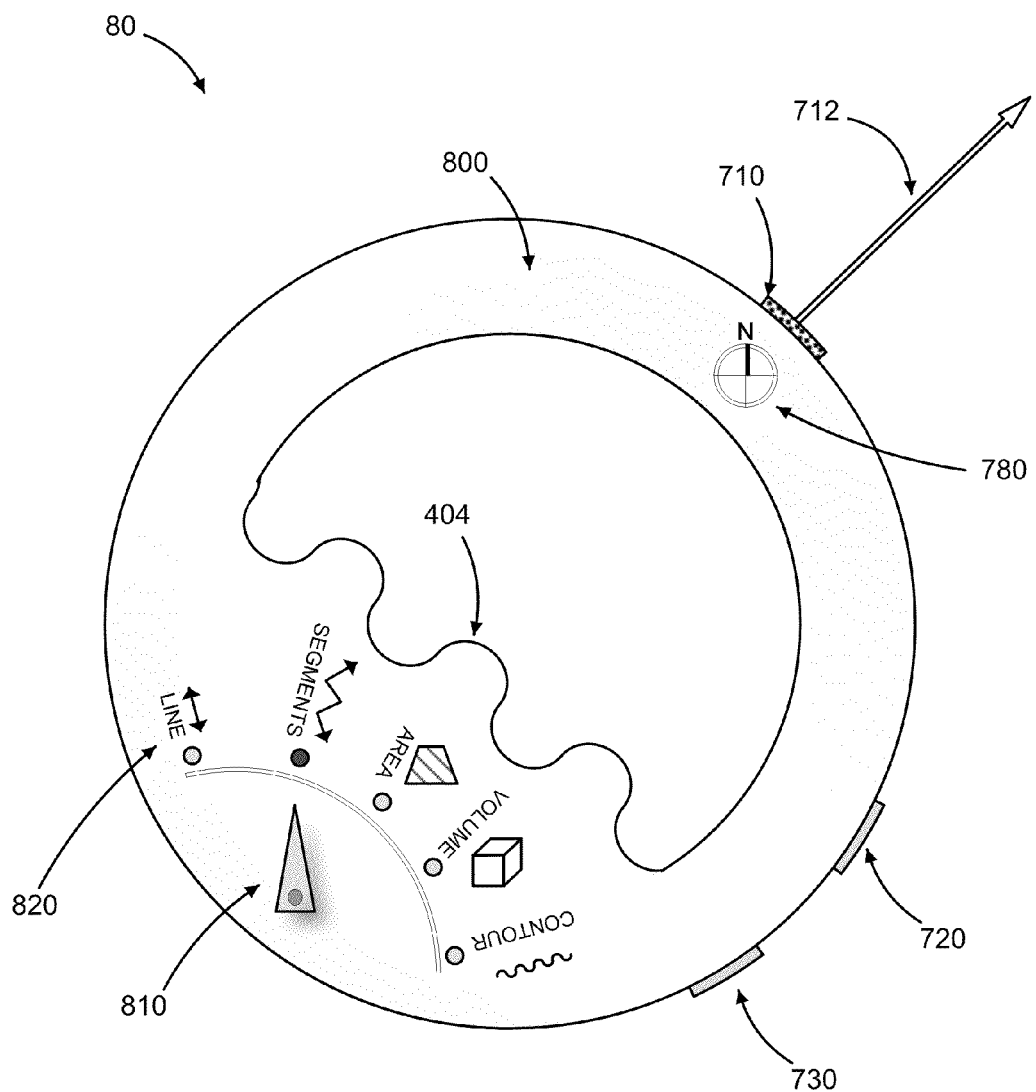
FIG. 6 illustrates an exemplary switch for operating mode selection.

FIG. 6 illustrates an exemplary switch for operating mode selection. Apparatus 80 may include similar features as those discussed herein, and further includes a manual multi-position selector 810 (e.g., a switch) for selecting one of a plurality of operating modes. It is to be appreciated that the switch 810 may take other forms, for example, as a multi-position slider, touch sensitive input device, and so forth. In the present illustrative example, selector 810 can be pivoted into one of five selectable modes of operation 820 (Line, Segments, Area, Volume, and Contour). A mechanical detent may assist the user in selecting the desired position of selector 810. In the example as illustrated, the apparatus is set to measure a combined length of multiple straight segments, such as in measuring the length of the perimeter of a rectangular ceiling of a bedroom. The various exemplary modes of operation will be discussed further below, but by way of simple guidance, a graphical icon may be printed beside each position of the selector 810. So for example, the "Line" mode, which measures the simple straight line distance from one point to another, may include a symbol or icon of a line beside it. The "Segments" mode may include a zig-zag or other graphical symbol evoking the same. The "Area" mode may be drawn as a shaded triangle or polygon. The "Volume" mode may be indicated as a cubical or similar object. The "Contour" mode of operation may be indicated as a generalized curve of some kind to indicate that the apparatus can measure the integrated path length along an essentially arbitrary path in two or three dimensions, as will be discussed below. It should be understood that other modes of operation, some of which are mentioned by way of example herein, can be incorporated. For example, a "Point" mode of operation where the apparatus merely measures the distance from the apparatus to a target point in space would be typically provided.

Figure 7:
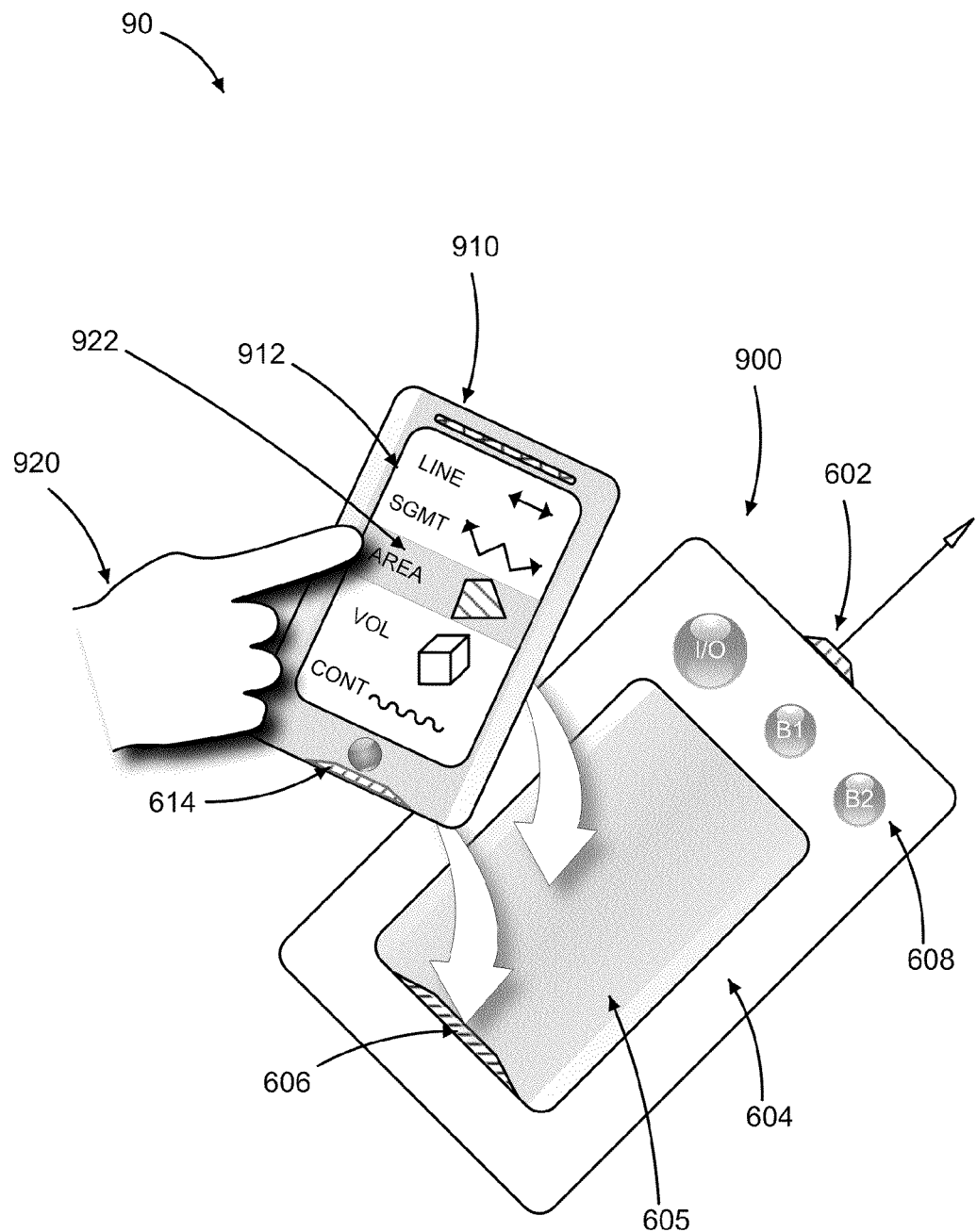
FIG. 7 illustrates an arrangement or a mobile apparatus that is hand-held and adapted for placement or mating with a docking station.

FIG. 7 illustrates an arrangement 90 or a mobile apparatus 910 that is hand-held and adapted for placement or mating with a docking station or other unit 900 as mentioned above. Here, the user interface 912 is displayed on a screen, such as a mobile phone screen found in modern personal electronic devices (e.g., but not limited to a iPhone® from Apple Computer of Cupertino, Calif.). A user uses his or her hand 920 to touch screen 912 and select one of a plurality of operating modes of the apparatus. The example shows the "Area" mode 922 being highlighted, pressed, and selected.

Figure 8:
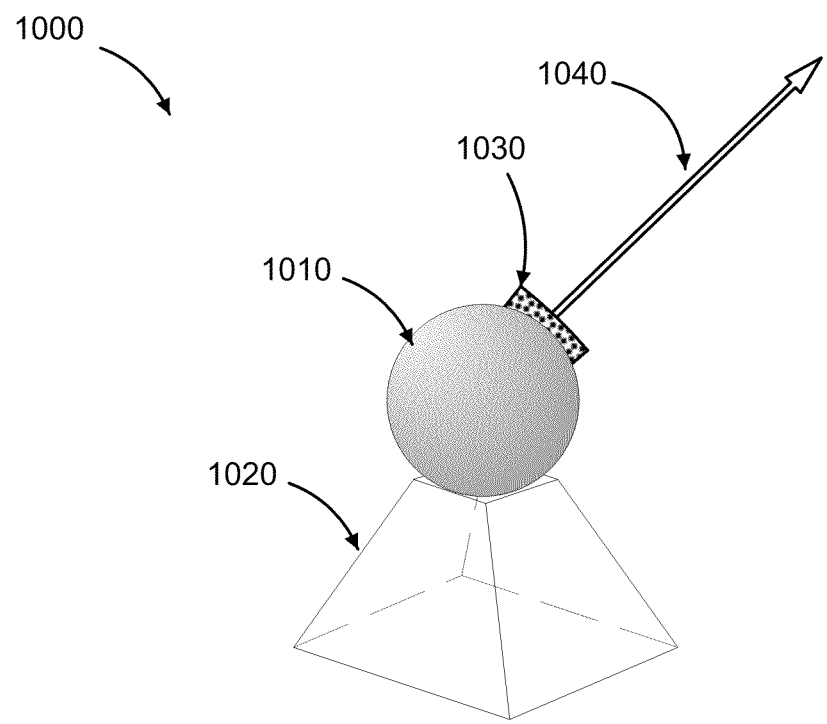
FIG. 8 illustrates an exemplary apparatus for measuring geometric distances.

FIG. 8 illustrates an exemplary apparatus 1000 for measuring geometric distances. A pyramidic or similar base 1020 may be supported on a solid surface such as a table top, counter top, tripod, on the ground, or held in a user's hand. A moveable articulated element 1010, such as a spherical ball shaped element, may provide rotational freedom to the apparatus to allow rotation of the apparatus from one target point to another. A laser source 1030 directs a laser beam 1040 towards one or more target locations in space, and may be rotated about using this articulated ball and socket arrangement without undue translational movement of the apparatus between pointing the apparatus to a corresponding plurality of target points.

Figure 9:
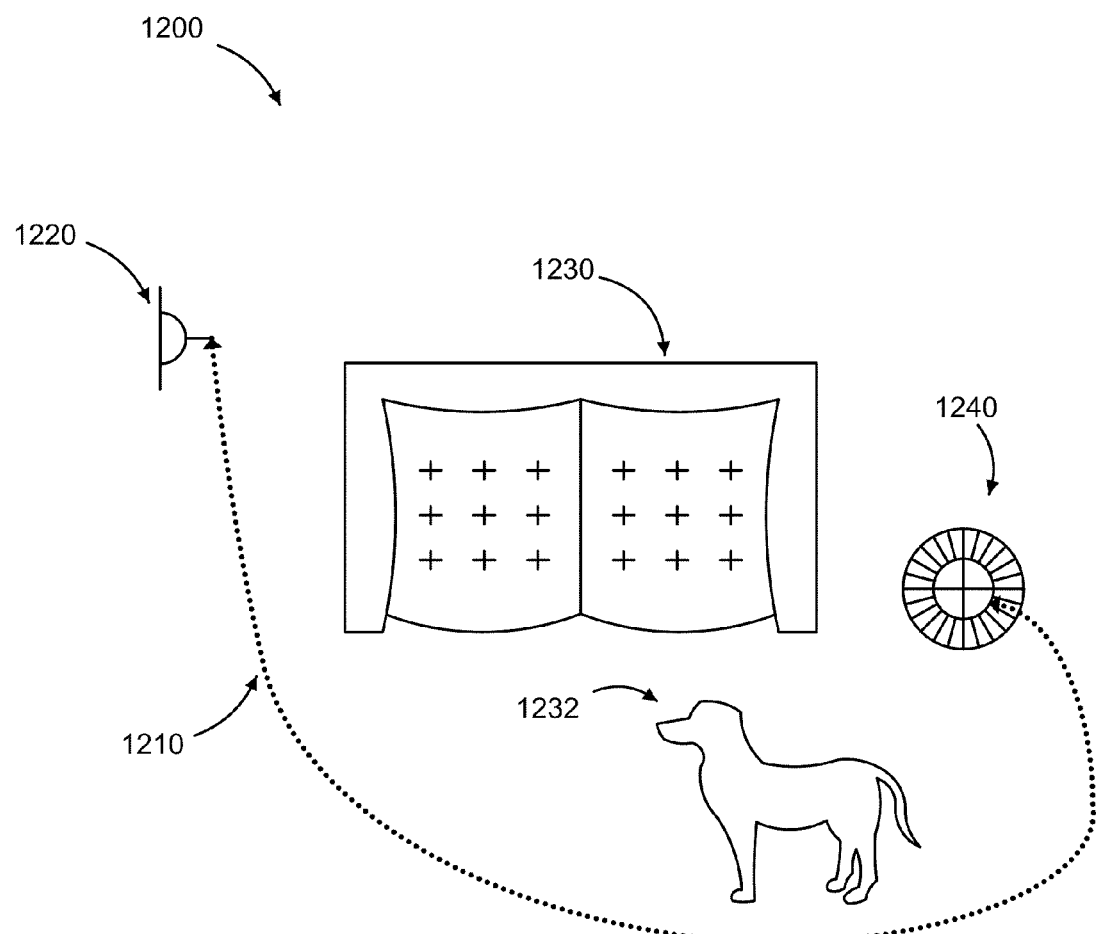
FIG. 9 illustrates the use of a "Contour" mode of operation.

FIG. 9 illustrates the use of the "Contour" mode of operation. Arrangement 1200 is merely illustrative. Here, an electrical cord 1210 is to be used to connect a floor lamp 1240 to a source of NC electricity from an electrical outlet 1220. To determine the length of electrical cord required, the user directs his or her geometric measurement apparatus to shine a path of visible light along the contoured path to be taken by the electrical cord. Objects in the way 1230, 1232 are to be avoided as the electrical cord 1210 is run around these objects. The apparatus takes frequent distance measurements along the path 1210 and adds up the resulting segments so that the integrated path length along 1210 is obtained and displayed. This strategy can be done for a path in two or three dimensions using the present concepts. Obviously, many other uses for this feature can be comprehended by those skilled in the art. For example, the present Contour length or curve length measuring method can be used to measure path lengths for landscaping, measurement of fabric or garment sizes, irregularly-shaped perimeters, and so on.

Figure 10:
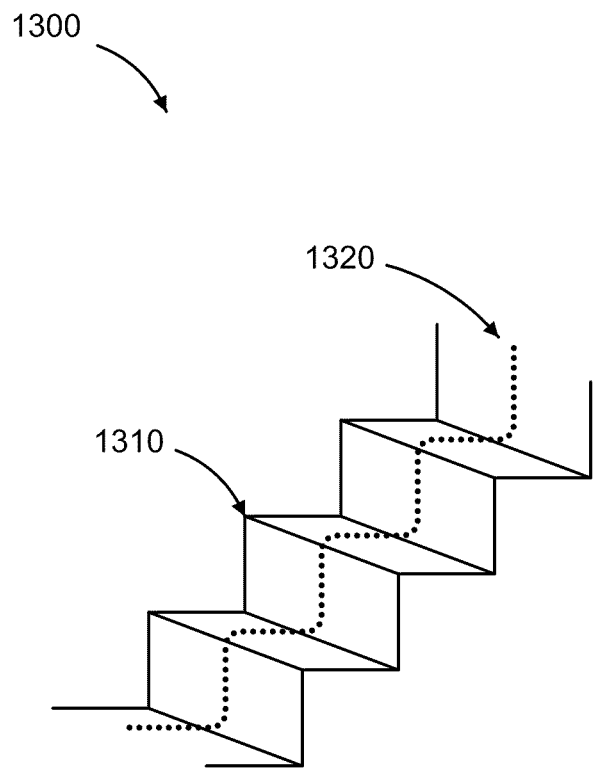
FIG. 10 illustrates the use of a "Segments" mode of operation.

FIG. 10 illustrates the use of the "Segments" mode of operation in scenario 1300. Consider a home owner or contractor who wishes to lay a runner carpet down a set or stairs 1310. A path 1320 can be measured by successive selection of and measurements to the vertices of the stairs. So the overall length of the required carpet runner would be the sum of the lengths of the stair runs and risers. If the apparatus is equipped with the Contour mode discussed above, then the user may simply use that mode and run the beam of the apparatus along the stairs from bottom to top (or top to bottom) to obtain substantially the same measurement. But in any case, it is appreciated that baseboard molding, crown molding, window casing, gutter lengths, and other useful quantities can be measured by summing up the lengths of individual straight segment lengths thereof.

All along, the present embodiments do not necessarily require that the measurement apparatus or its user be positioned at an edge or vertex or other special location with respect to the object being measured. As is discussed above, and will be described in detail below, the present apparatus and methods permit measurements of two-dimensional areas of arbitrary nature, and even three-dimensional measurements, from a reference point (e.g., a location of a measuring device) that is not placed or held in-plane of the object being measured. For example, a user may hold the apparatus in his or her hand, or may place the apparatus at a convenient location inside a room and conduct the desired measurements where a line of sight exists between the apparatus and target points of interest.

Figure 11:
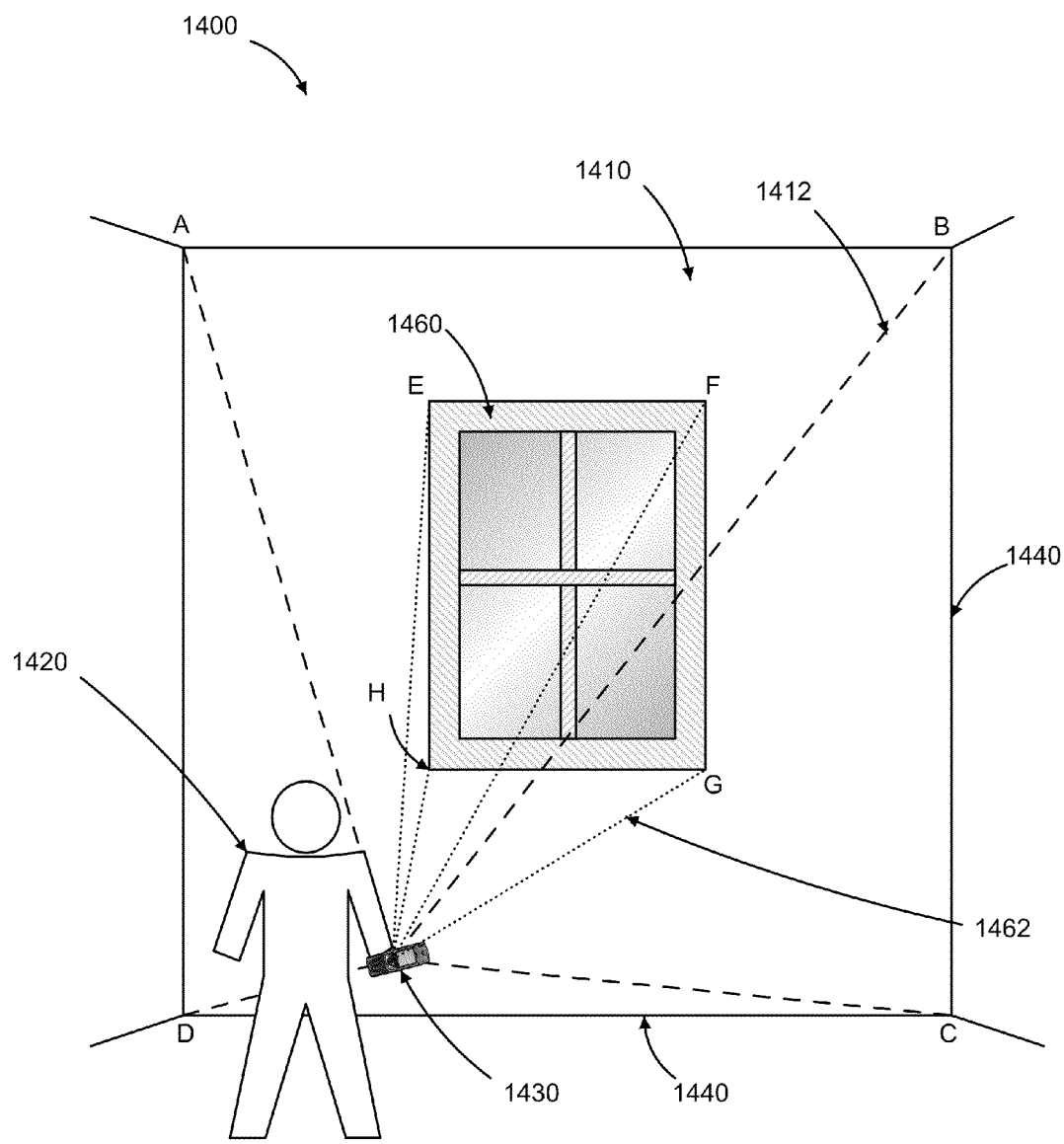
FIG. 11 illustrates a subtracted area measurement.

FIG. 11 illustrates a situation where a user 1420 uses a geometric distance measurement apparatus 1430 such as those described here to obtain the surface area of a wall 1410. In the scenario 1400, the rectangular wall 1410 has a rectangular window 1460 therein. However, it is understood that the geometries of the wall and the window are arbitrary and are not limited to rectangles. The user 1420 takes aim with the apparatus 1430 at a plurality of target points of interest for calculating the area of wall 1410. Here, points A, B, C and D are illuminated with respective optical beams from apparatus 1430, and the paths to these vertices of wall 1410 are shown as dashed lines 1412. The vertices A, B, C and D may be chosen and indicated by the user one at a time, for example by clicking on a button on apparatus 1430, or apparatus 1430 may have more than one beam that can be simultaneously shone onto a plurality of spots such as the vertices A, B, C and D, and these can, once targeted, kept illuminated with visible light dots from one or more lasers in apparatus 1430. As mentioned before, the actual position of the user 1420 and/or apparatus 1430 may be almost arbitrary, and preferably are just somewhere that has a line of sight to the vertices A, B, C and D so that they can be illuminated and targeted from apparatus 1430. Specifically, as is discussed elsewhere with relation to this disclosure, the apparatus 1430 may contain processing circuits and instructions to compute an area of a polygon such as the wall 1410 without needing to position said apparatus at a special position (e.g., a right angle, an edge 1440, a vertex, center, etc.).

In addition, user 1420 (for example by using the user interface of apparatus 1430) sets up the apparatus for another area measurement to obtain the area of window 1460. The beam paths to the window's vertices, points E, F, G and H are shown by dotted lines 1462. The area of the polygon (rectangle) of the window E, F, G, H can be determined similar to the way that the area of wall A, B, C, D was determined. The apparatus has a processing device as mentioned before that can subtract the area of window 1460 from the area of wall 1410 to obtain only the subtracted area of the wall without the window. This can be useful for example to determine how much paint or insulation or wall board or other building material applied to the wall is required. As mentioned earlier, once the quantity of the building material is determined, a pricing output may be generated accordingly (for example by multiplying the number of square feet of wall 1410 times the price of insulation per square foot).

In some embodiments, the user 1420 does not have to keep apparatus 1430 fixed in space as described earlier. That is, rather than keeping apparatus 1430 substantially at the same coordinates in 3-dimensional space and rotating it in place to point at the various target points, some embodiments allow for movement of the apparatus 1430 during use. The way the apparatus compensates for such movement is to detect such movement of the apparatus in space by way of the on-board accelerometers, gyroscopic devices, compass devices, or optical (camera) feature recognition. So, here, when user 1420 swings his or her arm or wrist to point the apparatus from a first target point to the next, the apparatus can make the respective distance measurements to the respective target points and subtract or compensate for the shift in its base position. Also, linear accelerometers or equivalent devices can be used to determine an angular movement of the apparatus.

It should be understood that by measuring the various respective distances from apparatus 1430 to points of interest A, B, C, D, E, F, G and H, the apparatus 1430 can compute the needed distances between one or more such points. For example, by measuring the distance from apparatus 1430 to point A and then from apparatus 1430 to point B, the apparatus can calculate the straight-line distance between points A and B. This is done by using the geometric and trigonometric relationships, e.g. of triangles, as mentioned elsewhere. Similarly, once the dimensions and/or angles describing a side are determined, the area may be determined, and then, once the dimensions and/or angles describing the faces of a volume are determined the volume itself may be determined. Therefore, from one-dimensional distance measurements, other higher dimensional geometrical quantities may be derived.

Figure 12:
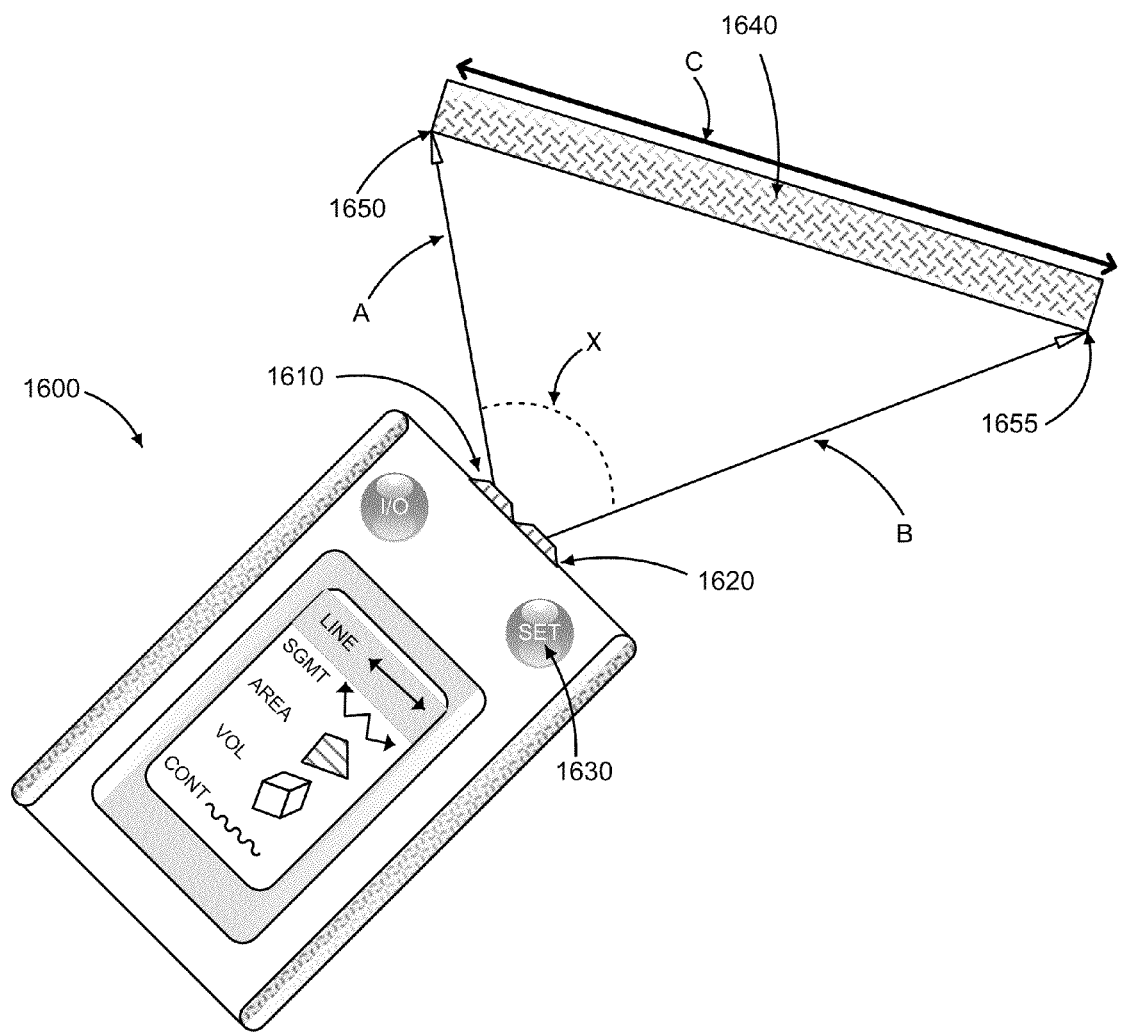
FIG. 12 illustrates a geometric measurement apparatus having more than one source to measure more than one distance to more than one point of interest.

FIG. 12 illustrates a geometric measurement apparatus 1600 having many features like those discussed before. Here, the apparatus includes two beam sources (e.g., light beams or ultrasound beams), and in some embodiments, coherent light sources 1610 and 1620, for delivering two corresponding beams of coherent light towards two target points of interest in space 1650 and 1655. The target points may be end points of a segment whose length a user wishes to determine (e.g., the length of a wooden beam or an edge of a wall or the separation between two points). In the present embodiment, the user can actuate a "Set" button 1630 (which can also be provided as a soft programmable widget on a touch screen interface) to set the apparatus or lock in the apparatus to take the measurement. For example, once the first laser source 1610 is pointed at the first target point of interest 1650 the user may press the Set button 1630, and the user may press the button 1630 a second time once the second laser source 1620 is shining its illumination spot onto the second target point of interest 1655. Alternatively, the user may press the Set button 1630 only once when the user has set the two laser beams on to the corresponding two target points of interest.

In other embodiments, a single laser source can be split into two (or more) components that have a coherent light beam each that can be used to measure a distance to a corresponding target point of interest. For example, a prism, mirror, beam splitter or other optical element can be used to split a single laser into more than one beam so that the various distances to the plurality of target points of interest can be determined. Also, a single beam can be made to rapidly (e.g., at a periodicity of a fraction of a second or some millisecond periodicity) be redirected between a number of positions in space to give the impression that the beam is a plurality of beams or to illuminate an arbitrary path in space by "painting" the path using the laser beam.

In some embodiments, two separate laser beam sources 1610 and 1620 (even if they share a common origin or power supply, or other components in a given design) are separately directable towards their respective target points of interest 1650 and 1655. Where the two sources originate from the same or a substantially co-located source, the length of 1640 (C) can be computed from knowledge of distances A and B to the respective first and second points of interest and the angle X included therebetween. A triangle can be determined having three vertex points: at the apparatus 1600, at the intersection of the two laser beams, at first target point 1650 and at second target point 1655. The length C can then be calculated from a law of cosines rule, which is used to calculate the length C of the object 1640 of interest having 1650 and 1655 as its two end points. Specifically, a processing circuit in apparatus 1600 executes instructions and acts on the input signals or data mentioned above to compute the length C as: $C=SQRT(A^2+B^2-2*A*B*COS(X))$, where SQRT means the square root operation, ^2 indicates the square of a quantity, the * symbol indicates a multiplication operation, and COS represents the trigonometric Cosine operation.

Note that the apparatus 1600 does not have to be physically located at a special position in space to take the present measurements. That is, as shown, the apparatus 1600 can be at a substantially arbitrary point in space with respect to the item being measured. The apparatus 1600 does not necessarily need to be positioned at a corner, edge, or vertex, or right angle to a component of the thing being measured. The processing circuits and instructions of the apparatus are adapted to make the present measurements and calculations from laws of cosines and other geometric, trigonometric and mathematical relationships which can be derived from the distance measurements, angle and inclination and acceleration measurements and other inputs as mentioned above. In some embodiments, a length of an object may be determined by summing or integrating several or many (e.g., dozens, hundreds, or thousands) or distinct position or distance measurements, and determining the final result from operations performed on the individual measurements in a distance measurement element in the apparatus.

With all of the present examples it should be appreciated that the discussions of a coherent light source are but a preferred embodiment. The distance measurements can be accomplished using other modalities. For example, acoustic or ultrasonic beams and pulses can be used to ping the target points, thereby obtaining a time-of-flight measurement of the distances thereto. The technique of time-of-flight may rely of a known or measured sound speed for the environment of the apparatus (e.g., air) and determine the distances by multiplying the measured delay time from ping to echo return by the speed of sound in the propagation medium. This technique may be replaced or augmented with phase measurement techniques and techniques using multi-frequency beams or projections to obtain more accurate distance measurements from a source at said measurement apparatus to a point of interest in space.

Figure 13:
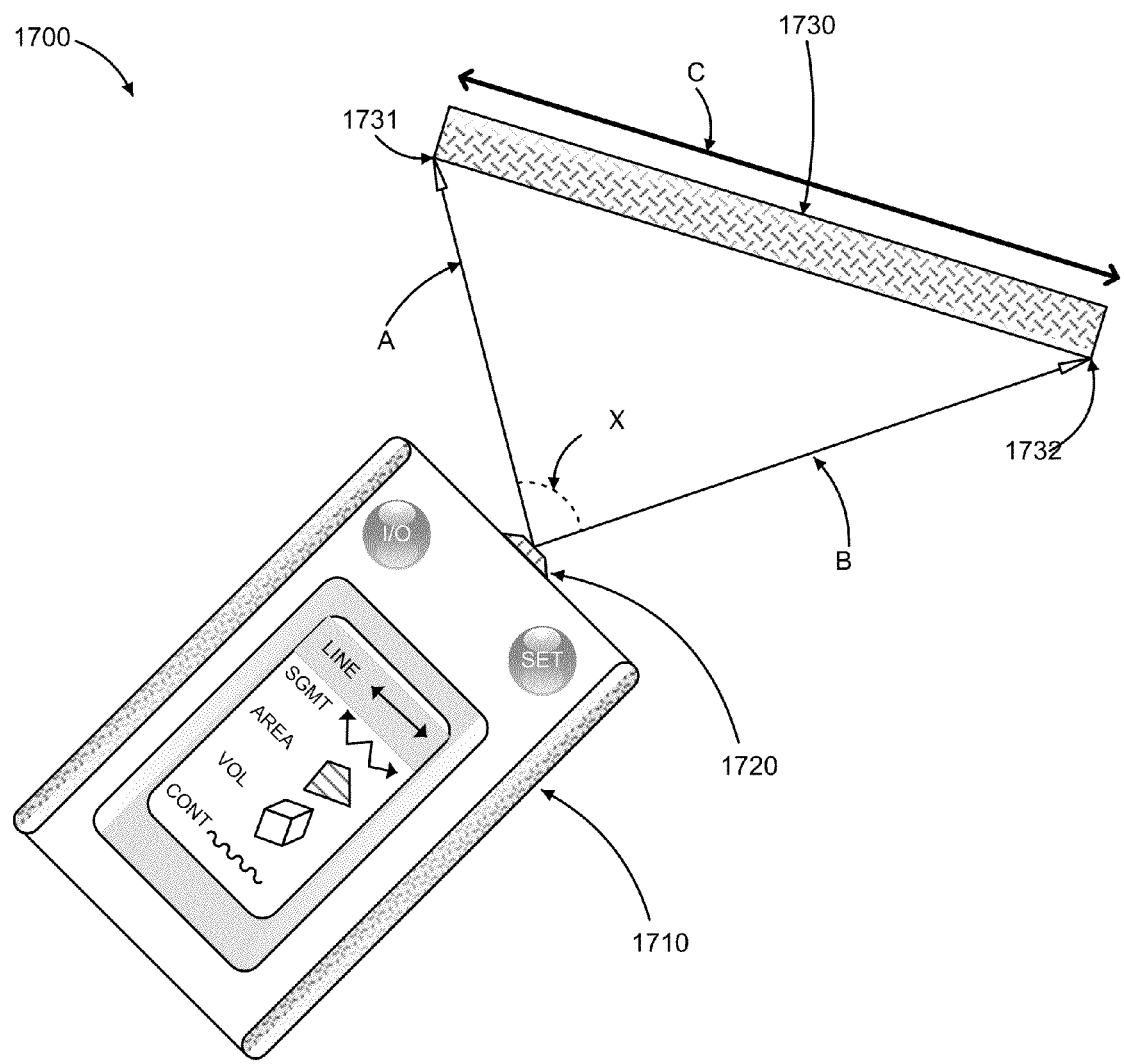
FIG. 13 illustrates a method for computing a length of a line segment between two points of interest according to some embodiments.

FIG. 13 illustrates a system 1700 including a portable measurement apparatus having a housing and an interface 1710 like those discussed above, and including a source 1720 that can emit or project a beam towards one or more target points of interest. In this example, two target points of interest, 1731 and 1732 are at respective opposing ends of an object 1730 the length of which (C) the user wishes to determine from a distance and without necessarily standing near or positioning apparatus 1710 at a special edge or vertex point with respect to object 1730.

A beam source 1720 may be a visible coherent light source, but is not so limited. A user of apparatus 1710 points or operates the apparatus so that the beam is directed from the source 1720 towards the first target point of interest, 1731. The apparatus' distance measurement component measures the distance A between the apparatus and the first target point of interest 1731. Simultaneously (using a beam splitter or a second beam as discussed earlier), or subsequently using the same source and beam, the beam is directed at the second target point of interest, 1732. The distance from the apparatus to the second target point 1732 is measured to be B. In addition, as mentioned before, an accelerometer, inertial device, gyroscope, compass, inclinometer, magnet, optical device, camera, or other sensory device is used to determine the angular separation between the first and second target points 1731 and 1732 with respect to the source 1720 (angle X).

Similar to that described earlier, a processing circuit in apparatus 1710 stores signals or data representative of the measured distances A, B and the angle X. In some embodiments, a law of cosines rule is used to calculate the length C of the object 1730 of interest having 1731 and 1732 as its two end points. Specifically, the processing circuit executes instructions and acts on the input signals or data mentioned above to compute the length C as: $C=SQRT(A^2+B^2-2*A*B*COS(X))$, where SQRT means the square root operation, ^2 indicates the square of a quantity, the * symbol indicates a multiplication operation and COS represents the trigonometric Cosine operation.

Once length C is calculated as described above, the result can be displayed on a display module of apparatus 1710. The result may also be stored in a memory device and may additionally be transmitted wirelessly or by a wired connection to another machine or storage location.

The process above can be carried out more than once, and in some embodiments, it may happen many times per second as the beam from source 1720 is scanned between a plurality of points of interest to form compound distance and length measurements. Additionally, as the angular movement of the apparatus can be determined in more than one dimension or degree of freedom, two and three dimensional geometric measurements can be performed as discussed above and further below.

The angle X and the pointing of the beam(s) towards the target points of interest can be accomplished by a suitable control for the directionality of the beam(s). For example, the beams may be steered by manual movement of the housing of the apparatus 1710. Alternatively, the beams may be steered using a control knob on the body of apparatus 1710 so that a user moves a knob or slider or other control device that controls the directional orientation of its beam with respect to the housing of apparatus 1710. Still alternatively, as is described in other applications by the present inventors and assignee, a graphical user interface based on a visual representation of the environment of apparatus 1710 and object 1730 may be used, in conjunction with a touch-screen input device to move the beam(s) to direct the same at the desired target points of interest.

Figure 14:
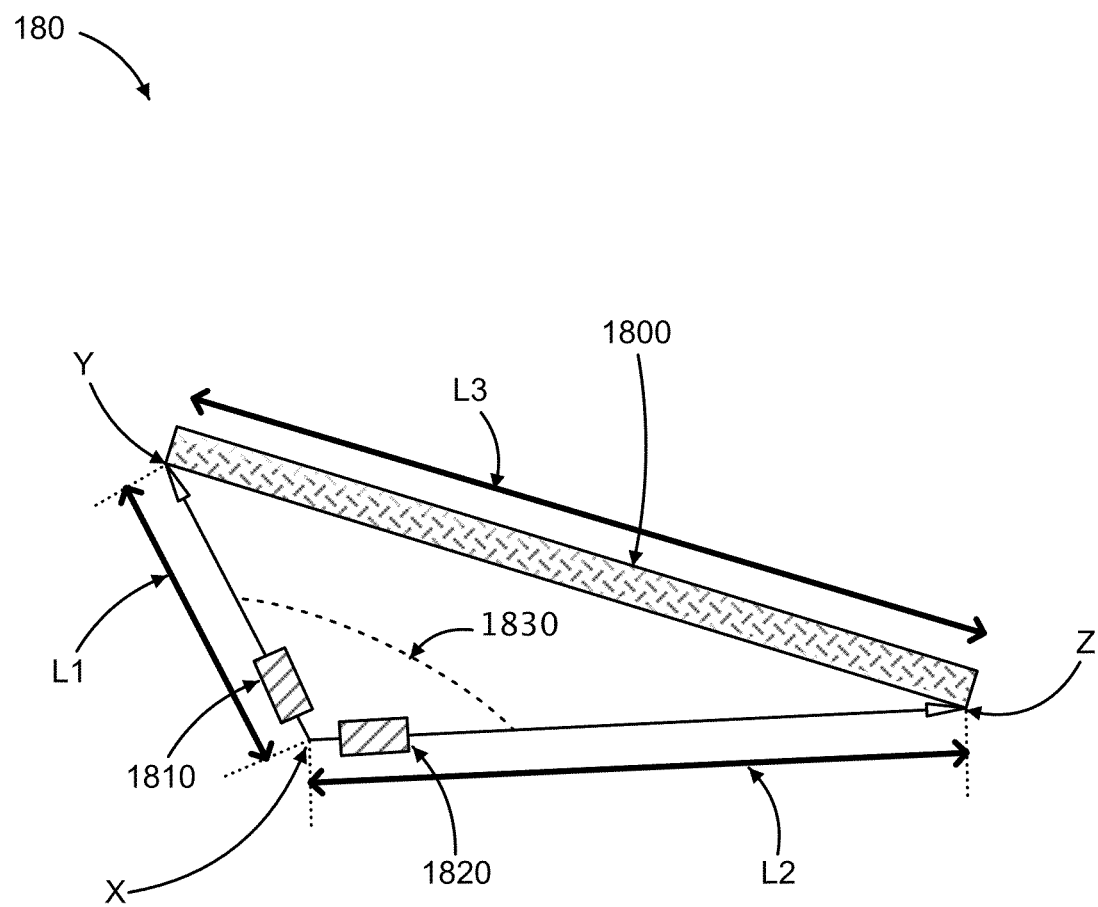
FIG. 14 illustrates a scenario for remote length measurement using two range finding measurement devices.

FIG. 14 illustrates a scenario 180 usable with the present systems and methods to determine a length of an object 1800 remotely (without needing to come into contact with the object). This can also be used to measure the straight line distance between any two points of interest. And a recursion of this technique can be used to measure multiple-segment objects (e.g., perimeters of rooms, polygons) or volumes of three-dimensional objects (e.g., the interior volume of an office) or even contoured lengths of general shape (e.g., by taking many small incremental straight line segments along the contour).

Object 1800 has an unknown length L3, which is defined by a distance between a first target point of interest Y and a second target point of interest Z at respective opposite ends of object 1800. A pair of distance measuring devices 1810 and 1820 are used to measure respective distances L1 and L2 between a reference point X and the two respective target points Y and Z. The reference point X may be a real or imagined position of an intersection of the lines from a user or a hand held apparatus to the target points Y and Z. If the two distance measuring devices 1810 and 1820 are relatively small, they can be very close together in space and substantially co-located in some instances so as to be approximately or actually at reference point X.

Two distance measuring beams are emitted from the two distance measuring devices 1810 and 1820 to respective target points of interest Y and Z. The distances from the measuring devices 1810, 1820 can be used to measure the respective lengths L1 and L2 from reference point X to respective target points Y and Z. As mentioned before, the pointing of the measuring devices may be done using a visible laser pointer to assist a user in targeting a laser spot onto the target points. A (visible or non-visible) light (e.g., laser) beam can be used to measure the distance to the respective target points of interest as said before, for example using a time-of-flight or an interferometry technique, or an ultrasonic beam may be used to measure the same, depending on the implementation of choice and the accuracy needed. A combination of distance measuring methods may also be used to measure the distances L1 and L2 separating the reference point X and the target points Y and Z respectively.

In addition to measuring the distances L1 and L2, whether by direct measurement or using a compensation so that they are measured with respect to an origin point at reference location X, the interior angle 1830 is determined. This angle is the interior angle between the two legs L1 and L2 in the triangle L1-L2-L3 defined by vertices X, Y and Z. The angle measurement can be done as described above using a number of measurement devices, including a compass device, which is pulled apart as the targeting of points Y and Z is taking place. The angle 1830 is recorded or a signal indicative of the same is delivered to a processor that computes the length of the separation between target points Y and Z according to a method such as the law of cosines method given above. More specifically, L3 (the length of the distance between target points Y and Z) can be calculated using the formula $L3=SQRT(L1^2+L2^2-2*L1*L2*COS(theta))$, where SQRT means the square root operation, ^2 indicates the square of a quantity, the * symbol indicates a multiplication operation and COS represents the trigonometric Cosine operation, and "theta" is shorthand for the interior angle shown in FIG. 18 by numeral 1830.

It is to be noted that variations on the exact exemplary technique and formula above can be devised and used without loss of generality, and are comprehended by the present disclosure as well. For example, if an exterior angle (360 degrees minus the interior angle 1830) is measured by the angle measuring means instead, the formula given above can be suitably modified to either determine the interior angle 1830 (being 360 minus the measured exterior angle) or the trigonometric relations adjusted to account for this related angle measured can be achieved. Similarly, if length adjustments or compensations are needed, this is comprehended by the present disclosure scope. For example, if distances L1 and L2 are derived from a greater or shorter related distance, there should be no change in scope of the present technique, as these compensations can be accounted for at the appropriate step in the method or in the formula given above. One example is if the two distance measuring devices 1810 and 1820 are not co-located exactly at the reference point X, then an extension or compensation can be accounted for to obtain L1 and L2 or an equivalent useful length to carry out the computation of L3. In some embodiments, the two distance measuring devices 1810 and 1820 are incorporated into a single apparatus or system and may share one housing unit.

Those skilled in the art will appreciate that by the above technique a user may wield a hand-held geometric measuring apparatus and position himself or herself essentially at an arbitrary location (e.g., X) with respect to the object being measured 1800. Other measuring devices require a user (or the measuring apparatus) to be positioned at a special location such as at one end of the object being measured, or at a right angle to a side of a triangle including the side whose length is being measured. These restraints are not limiting a user of the present apparatus who can for example just stand in a room, point the measurement targeting devices towards the points of interest and "shoot" or click a button to get the length of the line between the points of interest.

Also recall that while the above example describes a system having essentially two separate distance measuring devices 1810 and 1820 incorporated into a single geometric measurement apparatus, a similar result can be obtained in an embodiment where the two measurements L1 and L2 are done sequentially using a single distance measuring device, or may be done using two beams emanating from or split out of a single beam source to measure distance.

Figure 15:
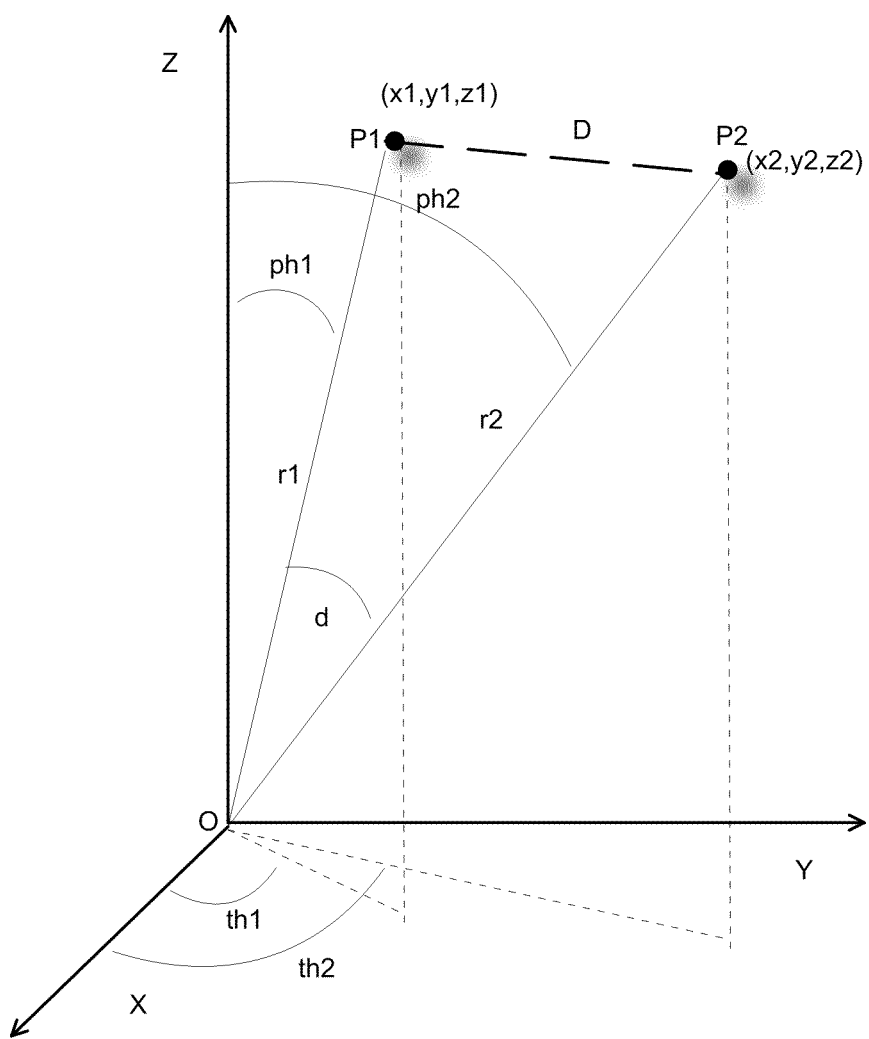
FIG. 15 illustrates measurement of lengths and angles of vectors connecting a reference point to points of interest in three-space with respect to a reference coordinate system.

FIG. 15 illustrates an exemplary geometry and frame of reference for designing and operating the above systems, and for guiding the programming of the instructions for performing the present methods in multiple dimensions.

Specifically, the figure illustrates a Cartesian coordinate system 150 having three mutually perpendicular axes (X, Y, Z) in 3-space. Two points of interest P1 and P2 are located at generally arbitrary locations (x1, y1, z1) and (x2, y2, z2) with respect to the origin (O). As known to those skilled in the art, suitable transformations between the Cartesian and the spherical coordinate systems are possible. In the spherical coordinate system P1 is located at (r1, th1, ph1) where r1 is the length of the ray segment connecting the origin O to the first point of interest P1 and th1 represents an azimuthal angle and ph1 represents an elevation angle of point P1 in 3-space. Similarly, the second point of interest P2 is defined by its coordinates (r2, th2, ph2) in the spherical coordinate system. Points P1 and P2 are themselves separated by a line segment length or distance having a length D. D would be the same whether the distance from P1 to P2 is measured in Cartesian, spherical, or other coordinate systems.

Lower-case (d) in the drawing refers to the angle between the two line segments O-P1 and O-P2, as measured in the plane containing both segments O-P1 and O-P2, which generally has azimuthal as well as elevational components. An angle measurement unit capable of directly measuring the angle d in said plane is used in some embodiments, while in other embodiments, separate angle measurements are made in respective degrees of freedom to arrive at the determination of angle d or an equivalent angular separation value corresponding to angle d. Therefore, as will be explained in more detail below, the measurement apparatus may be equipped with an angular measuring sensor that could directly measure the angular separation d between the rays connecting the origin O to the two points of interest P1 and P2, or, the angular separation d may be obtained from two orthogonal angular measurements (e.g., azimuthal and elevation) using two corresponding angle measuring sensors in the respective orthogonal degrees of freedom.

To facilitate a better understanding of what is involved in the above measurements and computations, the following formulae may be used to compute the Cartesian coordinates x, y, z for a point at distance r from the origin O and having an azimuthal angle (th) and an elevation angle (ph) in spherical coordinates:

$x = r\sin(ph)\cos(th)$ $y = r\sin(ph)\sin(th)$ $z = r\cos(ph)$

Also, the direct angle (d) between ray segments r1 and r2 can be computed using the formula:

$$d = \arccos \frac{a \cdot b}{|a||b|}$$

where "arccos" stands for the arc cosine (sometimes arcos or $\cos^{-1}$), and a is the three-dimensional vector (x1, y1, z1), b is the three-dimensional vector (x2, y2, z2), and the conventional notation (.) for vector dot product and vertical bars indicating magnitude of the vectors has been used.

One object of the present discussion is to illustrate a system and method for making a determination of the distance D between two points of interest P1 and P2, remotely, and without having to position the distance measurement apparatus in any special position (e.g., in-line, in-plane, etc.) with respect to one or both points of interest. It will follow that the circuitry and instructions that would be programmed for and executed on said circuitry (e.g., in a computer CPU or solid state processor) can be designed and arranged to facilitate such calculations using a hand-held apparatus as discussed in this and in related applications.

The above dot product is a tool for computing the normal projection of one thing onto another, which will be described below in a specific example to show how the projections of certain elements hereof is useful in computing constituent areas that are summed together to obtain a total area of a polygon of interest.

In Cartesian coordinates the distance D between points P1 and P2 is:

$D = \sqrt{(x_2-x_1)^2 + (y_2-y_1)^2 + (z_2-z_1)^2}$ which means that an apparatus having a processor that receives as inputs the Cartesian coordinates or dimensions in the right hand side of the above expression could compute the distance D and provide this as an output to be stored or displayed.

As discussed earlier, a Law of Cosines can be applied to (and in practice designed and implemented in hardware and/or software) compute the distance D as:

$$D=\sqrt{(r_1^2+r_2^2-2r_1r_2\cos d)}$$

Thus, the apparatus of the present embodiment has a processing circuit that would accept as inputs the straight line distances r1 and r2 between the origin O and the points of interest P1 and P2, respectively; as well as an input (d) representing the angular separation d between the two ray segments r1 and r2 and computes the cosine ("cos") thereof.

From the above discussion, it can also be seen that the distance D could be determined from the lengths and angles in the right hand side of the following expression:

$$D = \sqrt{\begin{array}{c}(r_1^2 + r_2^2 - 2r_1r_2[\sin(\text{ph1})\sin(\text{ph2})(\cos(th1)\cos(th_2) + \\ \sin(th1)\sin(th2)) + \cos(\text{ph1})\cos(\text{ph2})])\end{array}}$$

The processor would compute the distance D as given in the above expression, and a corresponding output is stored in a data storage (memory) location in the apparatus and/or displayed or otherwise provided as an output to another portion of the apparatus or computational method.

Accordingly, a user holding or mounting a measurement apparatus at a reference point O in space can merely swivel or direct the apparatus towards each of the points of interest P1 and P2, press a button to indicate that the apparatus is pointed at each point of interest, and the apparatus would be able to take angular measurements and distance recordings for the points of interest, and then compute and output the distance D between the two points of interest in 3-space. The user and the measurement apparatus do not have to stand at any special location with respect to points of interest P1, P2, or at any unique or special place with respect to the points.

We now turn to determination of two-dimensional areas of planar surfaces arbitrarily presented in 3-space. That is, as an example, to problems of measuring and computing the area of a polygon of interest such as the area of a rectangular wall.

Figure 16:
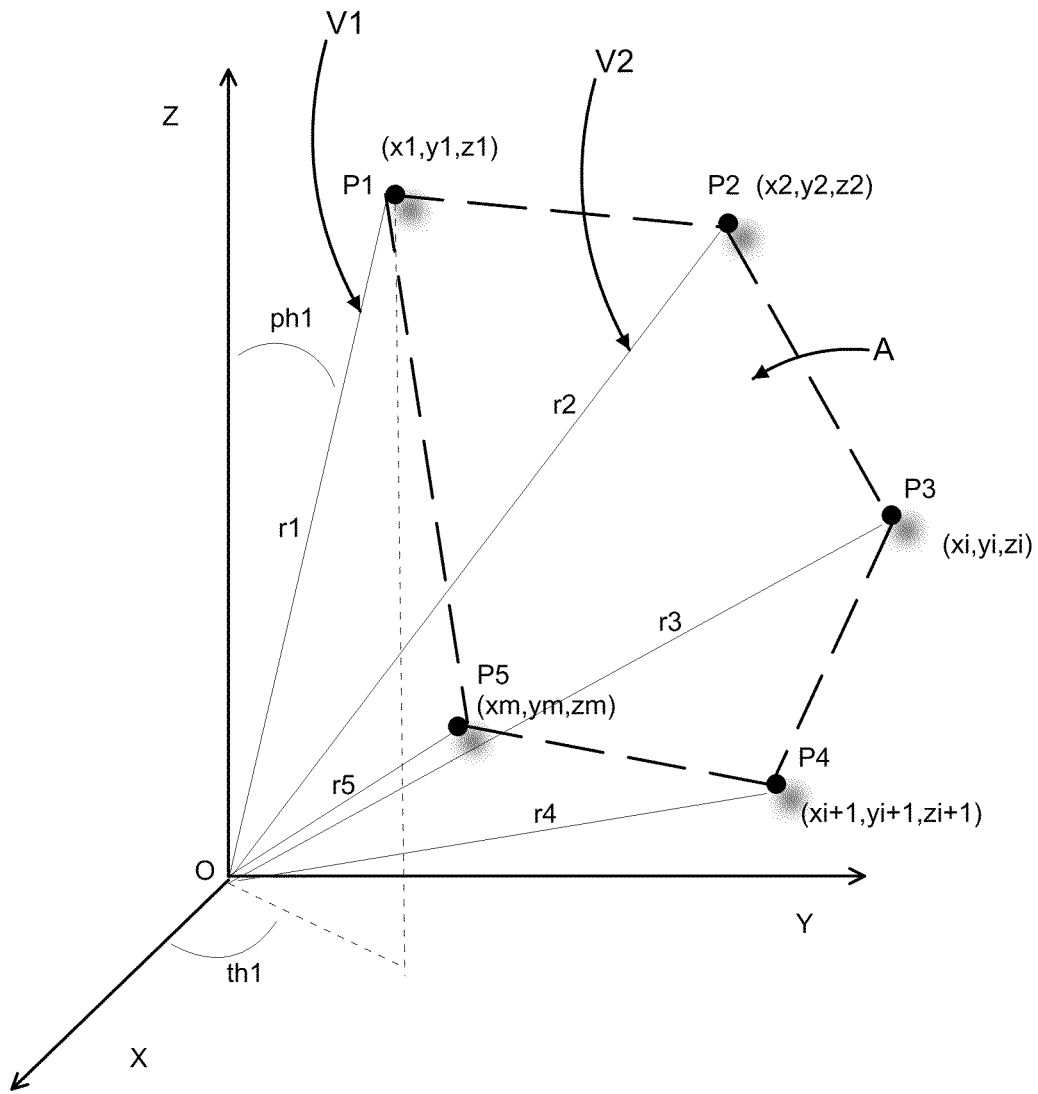
FIG. 16 illustrates measurement of an area of a polygon using the above principles and apparatus.

FIG. 16 illustrates the geometry for measuring the area (A) of a polygon from an arbitrary point O in three-space, not being in a plane of the polygon. In the illustrated example, which can be generalized to other polygons, the polygon has five (dashed line) sides connecting the five vertices P1 ... P5, and more generally, as said, a m-sided m-vertex polygon. As discussed before, with sufficiently many frequent measurements of an outline of the polygon, an arbitrary shape, including a rounded contoured area can be approximated and measured.

To repeat a point made above, the user and measurement apparatus measuring area A are here not required to be positioned in the plane of the polygon whose area is being measured, or at a special place with respect to any of the sides of the polygon. So a user holding the measurement apparatus can stand somewhere in a room at a place having line of sight access to the vertices of a wall and measure the area of the wall (or floor or ceiling of the room for that matter) by pointing the apparatus towards the vertices and indicating that the apparatus is pointed at respective points of interest, e.g., by pressing a button. As mentioned above, the apparatus may include a visible light beam providing a spot the user can see showing where the apparatus is pointing. Alternatively, the apparatus may include a camera and a visual display screen that shows an image and an indication of the location at which the measurement apparatus is pointed.

The area (A) of a m-sided polygon of interest is:

$$\text{Area}(A) = \frac{1}{2}n \cdot \sum_{i=1}^{m-1} V_i \times V_{i+1}$$

where n is unit normal vector to the plane of the polygon, the standard cross-product notation (x) is used, and where the vectors $V_i=(x_i,y_i,z_i)$ represent the ray segments from an origin (O) to the respective number (m) of points of interest $(x_i,y_i,z_i)$ that form the corresponding vertices of said polygon, and which are given in the above notation as:

$$x_i=r_i \sin(ph_i)\cos(th_i)$$

$$y_i=r_i \sin(ph_i)\sin(th_i)$$

$$z_i=r_i \cos(ph_i)$$

The unit normal vector n can be computed using at least three vectors $V_i=(x_i,y_i,z_i)$ in some embodiments to give:

$$n = \frac{(V_1 - V_2) \times (V_2 - V_3)}{\|(V_1 - V_2) \times (V_2 - V_3)\|}$$

Note that the cross product denoted by the symbol (x) of two vectors $(V_1, V_2)$ may be determined as:

$$V_1 \times V_2 = \begin{vmatrix} y_1 & z_1 \\ y_2 & z_2 \end{vmatrix} i - \begin{vmatrix} x_1 & z_1 \\ x_2 & z_2 \end{vmatrix} j + \begin{vmatrix} x_1 & y_1 \\ x_2 & y_2 \end{vmatrix} k$$

$$= (y_1z_2 - y_2z_1, x_2z_1 - x_1z_2, x_1y_2 - x_2y_1)$$

Returning to the above expression for the area (A) of the polygon:

$$\text{Area}(A) = \frac{1}{2}n \cdot \sum_{i=1}^{m-1} V_i \times V_{i+1}$$

It can be seen that the measuring apparatus, including a suitable processor and instructions that are executed by the processor can determine the area (A) of the polygon and return this result to be displayed to the user or to be stored or transmitted as needed. The area being a sum of cross products of the ray segment vectors connecting a reference point (O) and the respective points of interest at the vertices of the polygon in question.

It should be made clear that the present discussion uses the concepts of cross products of vectors as a tool and such a tool can be implemented by circuitry and instructions stored in and/or executed in a processing circuit or processor of an apparatus for measuring and computing geometric quantities. However, as would be appreciated by those skilled in the art upon reviewing the present disclosure, equivalent mathematical, algebraic and trigonometric steps can be derived so that a strict cross product per se would not be explicitly necessary to achieve the present calculations. For example, geometric methods and algebraic sums to compute an area of several constituent projections onto a plane of a polygon of interest would suffice as well, the area of the polygon thus being the total or sum of the areas of the projections onto the plane of the polygon, regardless of how the projected constituent areas are obtained. Also, the present examples which provide triangles as the constituent area elements can be generalized to other shaped, e.g., rectangles, in other embodiments, so long as they allow calculation of the sum of the constituent areas of the shapes to derive the total area.

Figure 17:
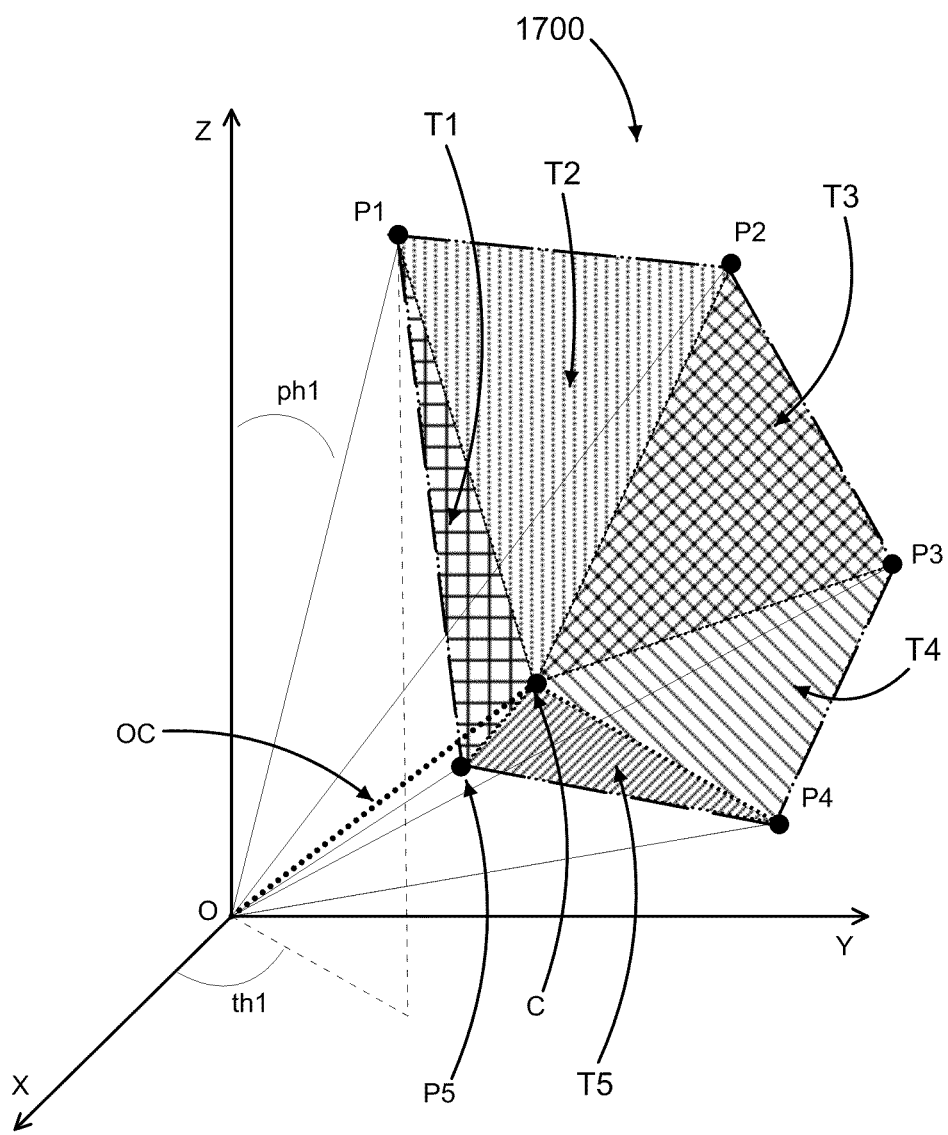
FIG. 17 illustrates triangular projections onto the surface of a polygon of interest, the sum of whose areas are the area of the polygon.

Now turning to FIG. 17, which illustrates a polygon 1700 having (merely by way of example) five vertices (P1, P2, P3, P4 and P5) as in FIG. Each vertex of polygon 1700 may be considered to be connectable to a point of origin O by a ray segment (r1, r2, . . . , r5) as mentioned before. Now, considering the polygon 1700 to be lying in a plane, the origin O and said ray segments (r1, . . . , r5) are generally out of said plane. And in the present example, the origin O may be at or offset from a distance measuring device, which measures the length of each ray segment r1, . . . , r5 to the five vertices of the polygon of interest. Aspects and embodiments hereof provide an apparatus with circuitry and instructions and components that do measure from O or a point offset with respect to O the respective distances r1, . . . , r5. Then, the apparatus computes the areas of the respective triangles (shown shaded as T1, T2, T3, T4 and T5), which represent the area of a projection of each of the sides of the pyramidic shape connecting the vertices P1, . . . , P5 to the point O. The sum of these projected areas (T1, . . . , T5) is then the area of the polygon of interest 1700. So, if a person is holding the distance measuring apparatus described earlier, he or she can point the apparatus towards each vertex on a polygon of interest 1700, then the apparatus through calculations like those given above computes the areas of the projected triangles T1, . . . , T5, sums those areas, and gives an output representing the area of the polygon 1700.

The normal vector dropped from point O out of the plane of polygon 1700 onto the surface of polygon 1700 lies along the bold dotted line connecting points O and C in FIG. 17. Each of the triangles of the pyramidic shape connecting point O to the vertices P1, . . . , P5 can be imagined to cast a "shadow" (shaded triangles) onto a portion of the face of polygon 1700, which is the projection of these sides onto the "base" polygon 1700 of said pyramidic object.

For the sake of clarity, and referring to FIG. 17, we see that the triangular projections are as follows:

Triangular projection T1 is the area projected onto the plane of polygon 1700 by the out-of-plane triangle defined by (O, P1, P2); triangular projection T2 is the area projected onto the plane of polygon 1700 by the out-of-plane triangle defined by (O, P2, P3); triangular projection T3 is the area projected onto the plane of polygon 1700 by the out-of-plane triangle defined by (O, P3, P4); triangular projection T4 is the area projected onto the plane of polygon 1700 by the out-of-plane triangle defined by (O, P4, P5); and triangular projection T5 is the area projected onto the plane of polygon 1700 by the out-of-plane triangle defined by (O, P5, P1). Therefore, the area of the polygon 1700 is the sum of the areas T1+T2+T3+T4+T5.

Note that for an essentially arbitrary shape, the object can be defined as a polygon with many vertices (hundreds, thousands, . . . ) by using the above "contour" mode of operation so that the apparatus marks and measures many closely separated points along the perimeter of the shape of interest, thus approximating a curved or arbitrary object as a many-sided polygon with many vertices.

It should be understood that the above principle, where distances to points of interest and angular displacements are used as inputs to compute the areas of constituent projected triangles can be used to compute a surface area of an object that is not even itself planar. The triangles, especially if divided into smaller constituent pieces could be made to "tile" a surface of a three-dimensional object and sum the areas of the smaller projected triangles from the device (at O) to various points of interest on the face of the object, yielding a total sum area for the surface of the object. One can visualize the present example by referring to the finite element method (FEM) meshes that generate a grid of triangles or other constituent shapes, the sum of whose areas would add up to the surface area of the general surface under investigation. Generally, the more small triangular constituent tiles are used, the closer an approximation to the true area of the three-dimensional surface can be made. A laser scanner that scans a line or other multi-point scan pattern onto such three-dimensional surfaces can in some aspects be used to more quickly map out the shape and/or surface area and/or the volume of the shape.

It should be understood that volumetric measurements are also available using these principles, applied to the other vertices of a volumetric space in three dimensions, such as those of a room or a box. As an example of such volumetric measurement, the amount of water to fill an empty pool may be determined, without even needing to descend into the pool space. The size of an air conditioning unit for a room of given volume may be computed, the size of a shipping carton can be measured, and so on. Note also that the Contour method of operation would allow such measurements on walls, windows, volumes and shapes of essentially arbitrary shape, and not merely on rectangular or polygonal shapes. This would be done by scanning the sighting point along the edges of a volume or pointing to the vertices of the volume if it is box-shaped to measure the necessary dimensions thereof.

As mentioned earlier, the entire apparatus may also be secured to a mounting or swiveling support unit for holding it still during measurements except for swiveling the apparatus to point at successive points of interest.

Additionally, a compact camera may be built into the apparatus in some embodiments so that a user can optionally take a photograph of the scene in which the distance measurement is being taken for each distance measurement. The captured images can be stored on the apparatus or can be downloaded to a computer for archiving or later review.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications and equivalents.

What is claimed is:

1. A method for measuring an area of a polygon having a plurality of vertices in space that define said polygon, comprising:
   selecting a reference point in space at or with respect to which a measuring apparatus can be positioned, said reference point not being in a plane of said polygon;
   determining a first vector between said reference point and a first target point of interest corresponding to a first vertex of said polygon;
   determining a second vector between said reference point and a second target point of interest corresponding to a second vertex of said polygon;
   continuing to determine other vectors to other corresponding target points of interest corresponding to other vertices of said polygon;
   determining a translational movement of said measuring apparatus in space indicative of a shift in a base position of the apparatus from a first location to a second translated location over some distance between said first and second locations;
storing data corresponding to determined vector quantities in a data storage element in said measuring apparatus;
illuminating a plurality of greater than two points along a visible path connecting each of said vertices to respective adjacent vertices, not including a source of illumination of said points, so as to illuminate to a user sides of a polygon defined by said vertices;
correcting for said determined translational movement of said apparatus so as to account for the movement of the apparatus between said first and second locations;
executing instructions in a processing circuit in said measuring apparatus to compute a sum of cross-products of respective determined vectors so as to compute an area of said polygon; and
delivering an output from said processing circuit representing said area of said polygon.

2. The method of claim 1, said determining of said vectors comprising measuring an angle in space for each of said target points of interest with respect to a reference coordinate system.

3. The method of claim 2, said measuring of said angle comprising measuring at least two component angles in at least two degrees of freedom with respect to said reference coordinate system.

4. The method of claim 3, said at least two component angles including at least one component in an azimuthal degree of freedom.

5. The method of claim 3, said at least two component angles including at least one component in an elevation degree of freedom.

6. The method of claim 2, measuring said angle in space comprising measuring a direct angular displacement between: a first vector connecting said reference point and a first target point of interest and a second vector connecting said reference point and a second target point of interest.

7. The method of claim 1, said determining of said vectors comprising measuring a distance from said reference point to each of said target points of interest using a distance measuring unit within said apparatus.

8. The method of claim 1, said reference point not being in a plane containing said polygon.

9. The method of claim 1, said step of executing instructions to determine the sum of cross products comprising determining respective areas of projected triangles onto said polygon of interest, then summing said respective areas to obtain the area of said polygon.

10. An apparatus for measuring and computing geometric dimensions, including an area of a polygon in space, comprising:
a housing suitable for a human user to grip and carry the apparatus thereby;
a coherent light source that can be directed along a direction so as to illuminate a target point of interest in space, said coherent light source being adapted and arranged to substantially illuminate a plurality of greater than two points between a first target point of interest and a second target point of interest, not including said coherent light source, so as to show a user a line segment connecting said first and second target points of interest that is being measured;
a distance measurement element including a circuit that determines a distance from the apparatus to said target point of interest;
an angular displacement or rotational sensing element that determines an angular position of said target point of interest;
a translation sensor sensing movement of a position of said apparatus in space;
a data storage element that stores data representative of said measured distance and said angular position;
a processor that receives inputs representative of at least said distance and said angular position for said target point of interest, representative of a vector connecting a reference point and said target point of interest, said processor further comprising circuitry and instructions adapted to compute a sum of cross-products of said vector with other vectors connecting said reference point and respective other target points of interest, said processor being programmed and arranged to compute triangular areas lying between vertices of said triangular areas represented by said points of interest and output triangular area projections being in a plane of a polygon defined by said target points of interest, said processor further receiving inputs representative of a translational movement of said position of said apparatus in space and compensating for said translational movement of the apparatus thereby compensating for a shift in the base location of said apparatus in space; and
a user interface adapted to receive inputs from said human user to control said operational features of said apparatus and adapted to display a result of said sum of said cross-products representative of an area of said polygon.

11. The apparatus of claim 10, said visual display unit comprising a display screen that indicates a mode of operation of said apparatus.

12. The apparatus of claim 10, said coherent light source adapted to illuminate a spot at each target point of interest towards which said apparatus is aimed in order to assist a user in confirming that said apparatus is aimed at the respective target points of interest.

13. The apparatus of claim 10, said angular displacement or rotation-sensing element comprising a sensor that senses an azimuthal angle with respect to a reference coordinate system and provides an output indicative of said azimuthal angle.

14. The apparatus of claim 10, said angular displacement or rotation-sensing element comprising a sensor that senses an elevation angle with respect to a reference coordinate system and provides an output indicative of said elevation angle.

15. The apparatus of claim 10, said angular displacement or rotation-sensing element comprising at least one sensor that senses an azimuthal and an elevation angle with respect to a reference coordinate system and provides at least one corresponding output indicative of said azimuthal and said elevation angles.

16. The apparatus of claim 10, said angular displacement or rotation-sensing element comprising a sensor that is coupled to an articulated mechanical support providing multiple degrees of freedom, said angular displacement or rotation-sensing element thereby arranged to provide an output indicative of an amount of angular rotation of said apparatus in said multiple degrees of freedom.

17. The apparatus of claim 10, further adapted for coupling with a mobile electronic device, said mobile electronic device comprising said visual display unit and said user interface, said visual display unit providing visual outputs to said user and said user interface receiving inputs from said user so as to select a mode of operation of said apparatus.

18. The apparatus of claim 10, further comprising a rotating support member that supports said apparatus and permits swiveling of said apparatus along multiple degrees of freedom substantially without translation of said apparatus.

19. An apparatus for measuring and computing geometric dimensions, including an area of a polygon in space, comprising:
- a housing suitable for a human user to grip and carry the apparatus thereby;
- a visible light source that can be directed along a direction so as to illuminate a target point of interest in space, said visible light source being adapted and arranged to substantially illuminate a plurality of greater than two points between a first target point of interest and a second target point of interest, not including said visible light source, so as to show a user a line segment connecting said first and second target points of interest that is being measured;
- a distance measurement element including a circuit that determines a distance from the apparatus to said target point of interest;
- an angular displacement or rotational sensing element that determines and angular position of said target point of interest;
- a translation sensor sensing movement of a position of said apparatus in space;
- a data storage element that stores data representative of said measured distance and said angular position;
- a processor that receives inputs representative of at least said distance and said angular position for said target point of interest, and that receives inputs representative of respective locations of other points of interest, said processor being programmed and arranged to compute triangular areas lying between vertices of said triangular areas represented by said points of interest and output projected areas of said triangular areas being in a plane of said polygon, said processor further being programmed and arranged to compute a sum of such said projected area and other such projected areas onto said plane of said polygon, said processor further receiving inputs representative of translational movement of said position of said apparatus in space and compensating for said translational movement of the apparatus thereby compensating for a shift in the base location of said apparatus in space; and
- a user interface adapted to receive inputs from said human user to control said operational features of said apparatus and adapted to display a result of said sum of said projected areas corresponding to a total area of said polygon defined by said points of interest.

* * * * *